(12) United States Patent
Caputo et al.

(10) Patent No.: US 8,777,722 B2
(45) Date of Patent: Jul. 15, 2014

(54) GAMING SYSTEM, GAMING DEVICE AND METHOD PROVIDING A GROUP OF TIMED GAMES

(75) Inventors: Scott A. Caputo, Santa Clara, CA (US); Dwayne A. Davis, Reno, NV (US); Scott T. Hilbert, Sparks, NV (US); Michael M. Oberberger, Reno, NV (US); Alexandria E. Sultich, Reno, NV (US)

(73) Assignee: IGT, Las Vegas, NV (US)

( * ) Notice: Subject to any disclaimer, the term of this patent is extended or adjusted under 35 U.S.C. 154(b) by 1167 days.

(21) Appl. No.: 12/268,901

(22) Filed: Nov. 11, 2008

(65) Prior Publication Data

US 2010/0120484 A1    May 13, 2010

(51) Int. Cl.
*A63F 9/24* (2006.01)

(52) U.S. Cl.
USPC .......................................................... 463/20

(58) Field of Classification Search
USPC .......................................................... 463/20
See application file for complete search history.

(56) References Cited

U.S. PATENT DOCUMENTS

| | | | |
|---|---|---|---|
| 4,363,485 A * | 12/1982 | Edwall | 273/121 A |
| 4,926,327 A * | 5/1990 | Sidley | 463/13 |
| 5,033,744 A | 7/1991 | Bridgeman et al. | |
| 5,042,818 A | 8/1991 | Weingardt | |
| 5,100,137 A | 3/1992 | Fulton | |
| 5,167,413 A | 12/1992 | Fulton | |
| 5,251,897 A | 10/1993 | Fulton | |
| 5,322,295 A | 6/1994 | Cabot et al. | |
| 5,411,257 A | 5/1995 | Fulton | |
| 5,431,408 A | 7/1995 | Adams | |
| 5,437,451 A | 8/1995 | Fulton | |
| 5,531,448 A | 7/1996 | Moody | |
| 5,573,249 A | 11/1996 | Johnson | |
| 5,636,842 A | 6/1997 | Cabot et al. | |
| 5,732,950 A | 3/1998 | Moody | |
| 5,755,621 A | 5/1998 | Marks et al. | |
| 5,769,716 A | 6/1998 | Saffari et al. | |
| 5,803,809 A | 9/1998 | Yoseloff | |
| 5,816,915 A | 10/1998 | Kadlic | |
| 5,820,460 A | 10/1998 | Fulton | |
| 5,823,873 A | 10/1998 | Moody | |
| 5,833,536 A | 11/1998 | Davids et al. | |
| 5,839,731 A | 11/1998 | Feola | |
| 5,882,259 A | 3/1999 | Holmes, Jr. et al. | |
| 5,911,418 A | 6/1999 | Adams | |
| 5,954,335 A | 9/1999 | Moody | |
| 5,957,774 A | 9/1999 | Holmes, Jr. et al. | |
| 5,971,849 A * | 10/1999 | Falciglia | 463/16 |
| 5,976,016 A | 11/1999 | Moody et al. | |

(Continued)

FOREIGN PATENT DOCUMENTS

| | | |
|---|---|---|
| WO | WO93/14462 | 7/1993 |
| WO | 2005097280 | 10/2005 |

(Continued)

*Primary Examiner* — Xuan Thai
*Assistant Examiner* — Michael Grant
(74) *Attorney, Agent, or Firm* — Neal, Gerber & Eisenberg LLP

(57) ABSTRACT

The gaming system, gaming device and gaming method provides a plurality of sequential player events in which the player must take an action in a designated period of time and where the player has less time to take the action in each subsequent event.

18 Claims, 27 Drawing Sheets

(56) References Cited

U.S. PATENT DOCUMENTS

| | | |
|---|---|---|
| 6,007,066 A | 12/1999 | Moody |
| 6,050,568 A | 4/2000 | Hachquet |
| 6,062,979 A | 5/2000 | Inoue |
| 6,098,985 A | 8/2000 | Moody |
| 6,110,041 A | 8/2000 | Walker et al. |
| 6,120,031 A | 9/2000 | Adams |
| 6,120,378 A | 9/2000 | Moody et al. |
| 6,135,882 A | 10/2000 | Kadlic |
| 6,135,883 A | 10/2000 | Hachquet |
| 6,196,547 B1 | 3/2001 | Pascal et al. |
| 6,238,288 B1 | 5/2001 | Walker et al. |
| 6,293,866 B1 | 9/2001 | Walker et al. |
| 6,311,978 B1 | 11/2001 | Moody |
| 6,312,332 B1 | 11/2001 | Walker et al. |
| 6,315,291 B1 | 11/2001 | Moody |
| 6,322,078 B1 | 11/2001 | Adams |
| 6,334,613 B1 | 1/2002 | Yoseloff |
| 6,343,988 B1 | 2/2002 | Walker et al. |
| 6,364,313 B1 | 4/2002 | Moody |
| 6,413,160 B1 | 7/2002 | Vancura |
| 6,419,578 B1 | 7/2002 | Moody |
| 6,494,454 B2 | 12/2002 | Adams |
| 6,517,074 B1 | 2/2003 | Moody et al. |
| 6,561,898 B2 | 5/2003 | Moody |
| 6,568,680 B1 | 5/2003 | Moody et al. |
| 6,572,473 B1 | 6/2003 | Baerlocher |
| 6,616,142 B2 | 9/2003 | Adams |
| 6,652,377 B1 | 11/2003 | Moody |
| 6,672,959 B2 | 1/2004 | Moody et al. |
| 6,695,700 B2 | 2/2004 | Walker et al. |
| 6,722,983 B2 | 4/2004 | Kaminkow et al. |
| 6,726,427 B2 | 4/2004 | Jarvis et al. |
| 6,729,961 B1 | 5/2004 | Millerschone |
| 6,733,390 B2 | 5/2004 | Walker et al. |
| 6,761,632 B2 | 7/2004 | Bansemer et al. |
| 6,780,103 B2 | 8/2004 | Bansemer et al. |
| 6,852,027 B2 | 2/2005 | Kaminkow et al. |
| 6,863,606 B1 | 3/2005 | Berg et al. |
| 6,913,535 B2 | 7/2005 | Kaminkow et al. |
| 6,918,830 B2 | 7/2005 | Baerlocher |
| 6,942,568 B2 | 9/2005 | Baerlocher |
| 6,955,356 B2 | 10/2005 | Moody |
| 6,964,418 B2 | 11/2005 | Moody |
| 6,969,316 B2 | 11/2005 | Jarvis et al. |
| 6,984,174 B2 | 1/2006 | Cannon et al. |
| 6,988,732 B2 | 1/2006 | Vancura |
| 6,991,538 B2 | 1/2006 | Cannon |
| 6,994,624 B2 | 2/2006 | Gold et al. |
| 7,048,275 B2 | 5/2006 | Adams |
| 7,056,210 B2 | 6/2006 | Bansemer et al. |
| 7,059,965 B2 | 6/2006 | Jackson |
| 7,077,744 B2 | 7/2006 | Cannon |
| 7,137,628 B2 | 11/2006 | Moody |
| 7,156,397 B2 | 1/2007 | Moody et al. |
| 7,175,521 B2 | 2/2007 | Mcclintic |
| 7,175,524 B2 | 2/2007 | Bansemer et al. |
| 7,198,569 B2 | 4/2007 | Wolf et al. |
| 7,220,180 B2 | 5/2007 | Kaminkow et al. |
| 7,222,857 B2 | 5/2007 | Moody |
| 7,222,858 B2 | 5/2007 | Moody |
| 7,247,092 B2 | 7/2007 | Jarvis et al. |
| 7,297,057 B2 | 11/2007 | Gerrard et al. |
| 7,326,115 B2 | 2/2008 | Baerlocher |
| 7,331,863 B2 | 2/2008 | Baerlocher |
| 7,354,344 B2 | 4/2008 | Paulsen et al. |
| 7,387,568 B2 | 6/2008 | Millerschone |
| 7,390,258 B2 | 6/2008 | Millerschone |
| 7,393,276 B2 | 7/2008 | Millerschone |
| 7,404,762 B2 | 7/2008 | Moody |
| 7,419,162 B2 | 9/2008 | Lancaster et al. |
| 7,431,644 B2 | 10/2008 | Moody |
| 2001/0038178 A1 | 11/2001 | Vancura |
| 2002/0042296 A1 | 4/2002 | Walker et al. |
| 2002/0045473 A1 | 4/2002 | Walker et al. |
| 2002/0132660 A1 | 9/2002 | Taylor |
| 2003/0001335 A1 | 1/2003 | Vancura et al. |
| 2003/0125107 A1 | 7/2003 | Cannon |
| 2004/0102238 A1 | 5/2004 | Taylor |
| 2004/0219963 A1 | 11/2004 | Vancura |
| 2004/0242297 A1 | 12/2004 | Walker et al. |
| 2004/0266516 A1 | 12/2004 | Thomas |
| 2004/0266517 A1 | 12/2004 | Bleich et al. |
| 2005/0020352 A1 | 1/2005 | Chilton et al. |
| 2005/0054429 A1 | 3/2005 | Baerloche et al. |
| 2005/0101378 A1 | 5/2005 | Kaminkow et al. |
| 2005/0124402 A1* | 6/2005 | Miller .............................. 463/13 |
| 2005/0181853 A1 | 8/2005 | Baerlocher |
| 2006/0063578 A1 | 3/2006 | Bansemer et al. |
| 2006/0066051 A1 | 3/2006 | Nicely |
| 2006/0084501 A1* | 4/2006 | Walker et al. ................... 463/25 |
| 2006/0131810 A1 | 6/2006 | Nicely |
| 2006/0154714 A1 | 7/2006 | Montross et al. |
| 2006/0205474 A1 | 9/2006 | Bansemer et al. |
| 2006/0246977 A1 | 11/2006 | Cannon |
| 2006/0247031 A1* | 11/2006 | Walker et al. ................... 463/25 |
| 2006/0267283 A1 | 11/2006 | Jackson |
| 2007/0021178 A1 | 1/2007 | Kobayashi |
| 2007/0054721 A1 | 3/2007 | Jackson |
| 2007/0060241 A1 | 3/2007 | Low et al. |
| 2007/0129128 A1 | 6/2007 | Mcclintic |
| 2007/0129133 A1 | 6/2007 | Bansemer et al. |
| 2007/0129147 A1 | 6/2007 | Gagner |
| 2007/0135193 A1 | 6/2007 | Nicely |
| 2007/0135194 A1 | 6/2007 | Nicely et al. |
| 2007/0228656 A1 | 10/2007 | Jackson |
| 2007/0293293 A1 | 12/2007 | Baerlocher et al. |
| 2007/0298857 A1 | 12/2007 | Schlottmann et al. |
| 2008/0026806 A1 | 1/2008 | Gold et al. |
| 2008/0045344 A1 | 2/2008 | Schlottmann et al. |
| 2008/0064462 A1 | 3/2008 | Gerrard et al. |
| 2008/0064502 A1 | 3/2008 | Schlottmann et al. |
| 2008/0070680 A1 | 3/2008 | Baerlocher et al. |
| 2008/0070692 A1 | 3/2008 | Schlottmann et al. |
| 2008/0070693 A1 | 3/2008 | Schlottmann et al. |
| 2008/0070694 A1 | 3/2008 | Schlottmann et al. |
| 2008/0070695 A1 | 3/2008 | Baerlocher et al. |
| 2008/0108404 A1 | 5/2008 | Iddings et al. |
| 2008/0111309 A1 | 5/2008 | Nicely et al. |
| 2008/0113704 A1 | 5/2008 | Jackson |
| 2008/0119257 A1 | 5/2008 | Stern et al. |
| 2008/0119283 A1 | 5/2008 | Baerlocher |
| 2008/0188278 A1 | 8/2008 | Paulsen et al. |
| 2008/0217855 A1* | 9/2008 | Sloan ............................ 273/292 |
| 2008/0252011 A1 | 10/2008 | Bickley et al. |
| 2008/0268958 A1 | 10/2008 | Walker et al. |
| 2008/0274783 A1 | 11/2008 | Walker et al. |
| 2009/0005144 A1 | 1/2009 | Moody |
| 2009/0124357 A1* | 5/2009 | Acres .............................. 463/25 |
| 2010/0056248 A1* | 3/2010 | Acres .............................. 463/20 |

FOREIGN PATENT DOCUMENTS

| | | |
|---|---|---|
| WO | WO2005/110563 | 11/2005 |
| WO | WO2006/031417 | 3/2006 |
| WO | WO2006/121663 | 11/2006 |
| WO | WO2007/059471 | 5/2007 |
| WO | WO2008/141378 | 11/2008 |

* cited by examiner

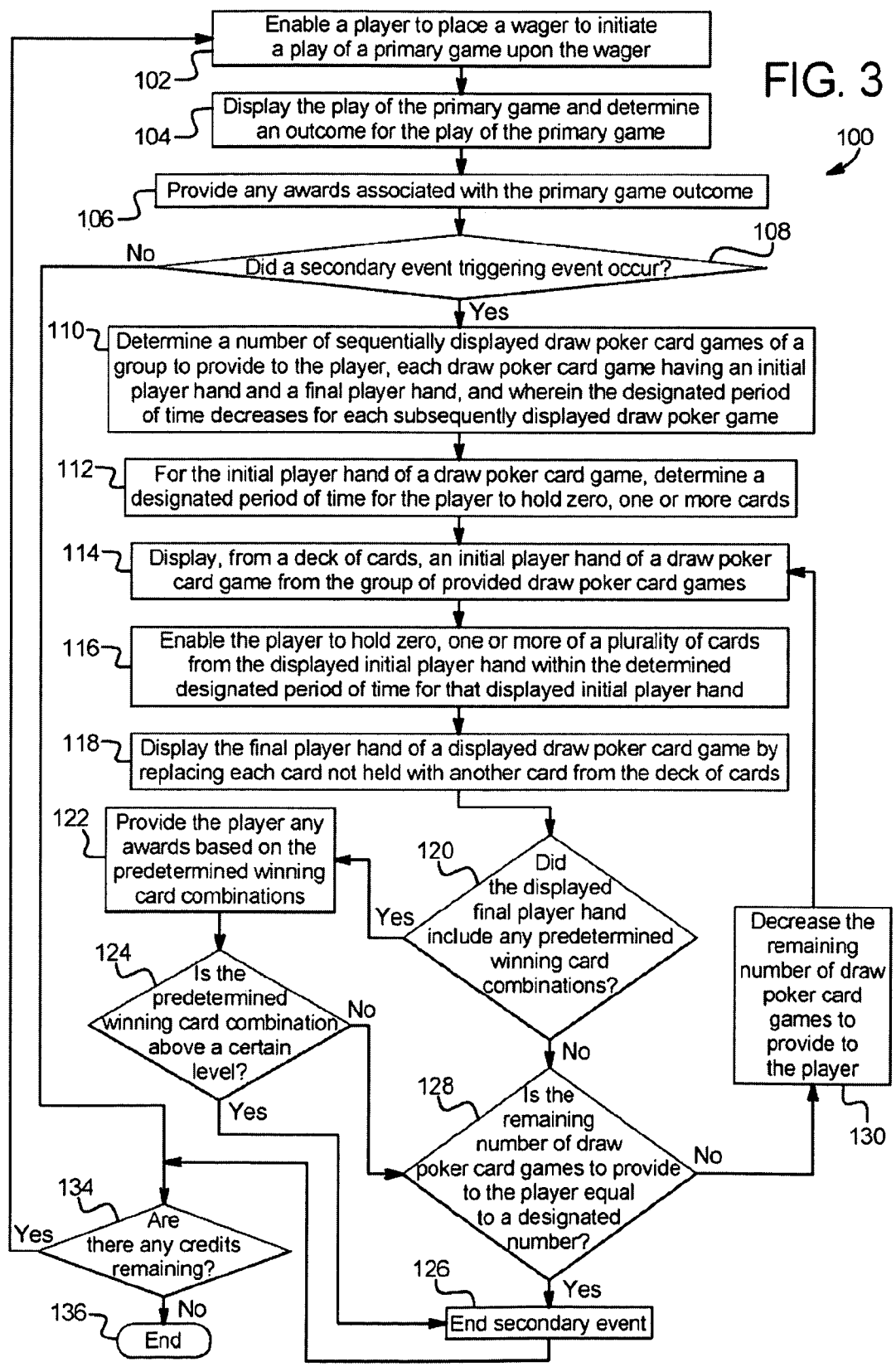

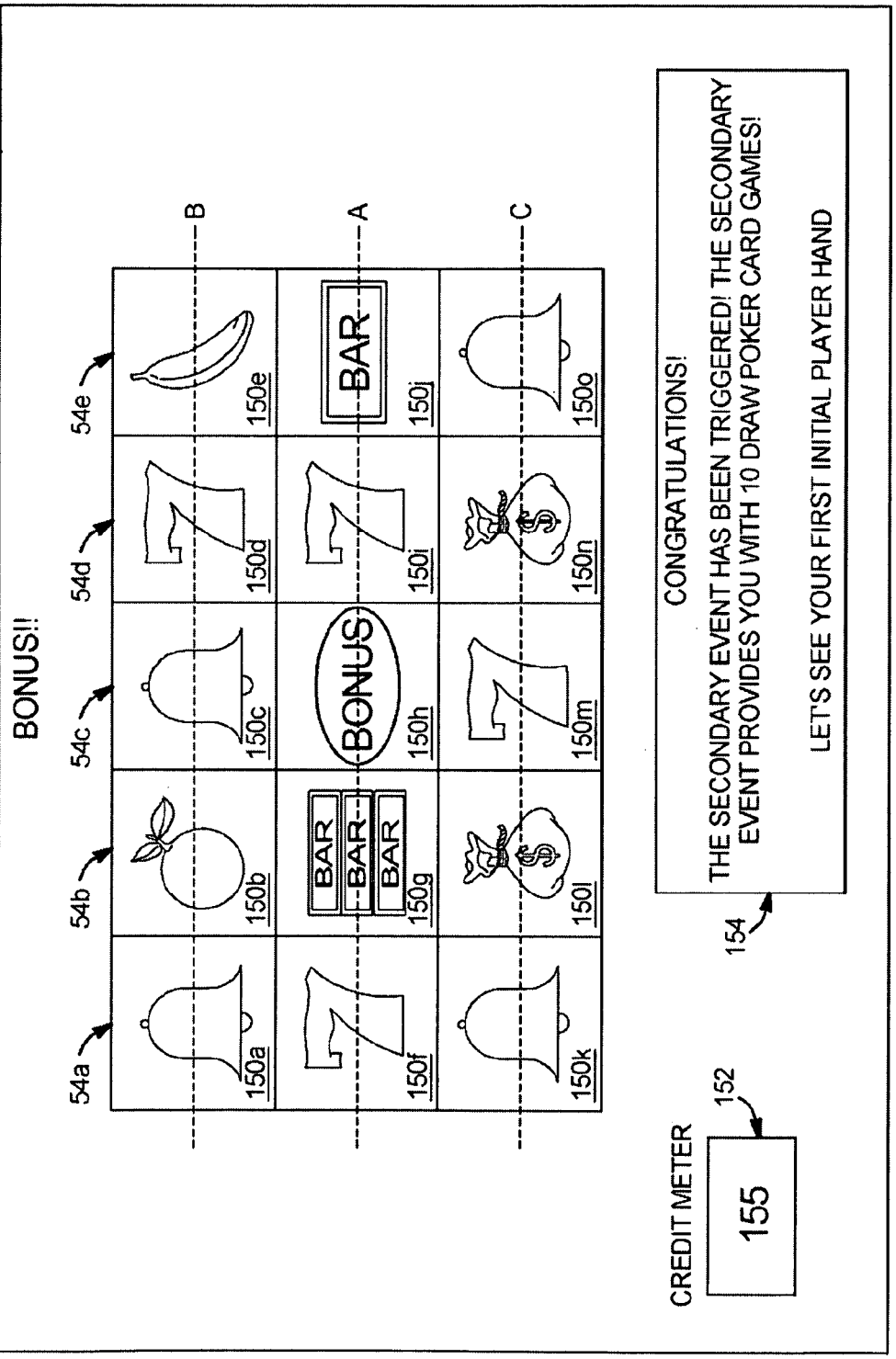

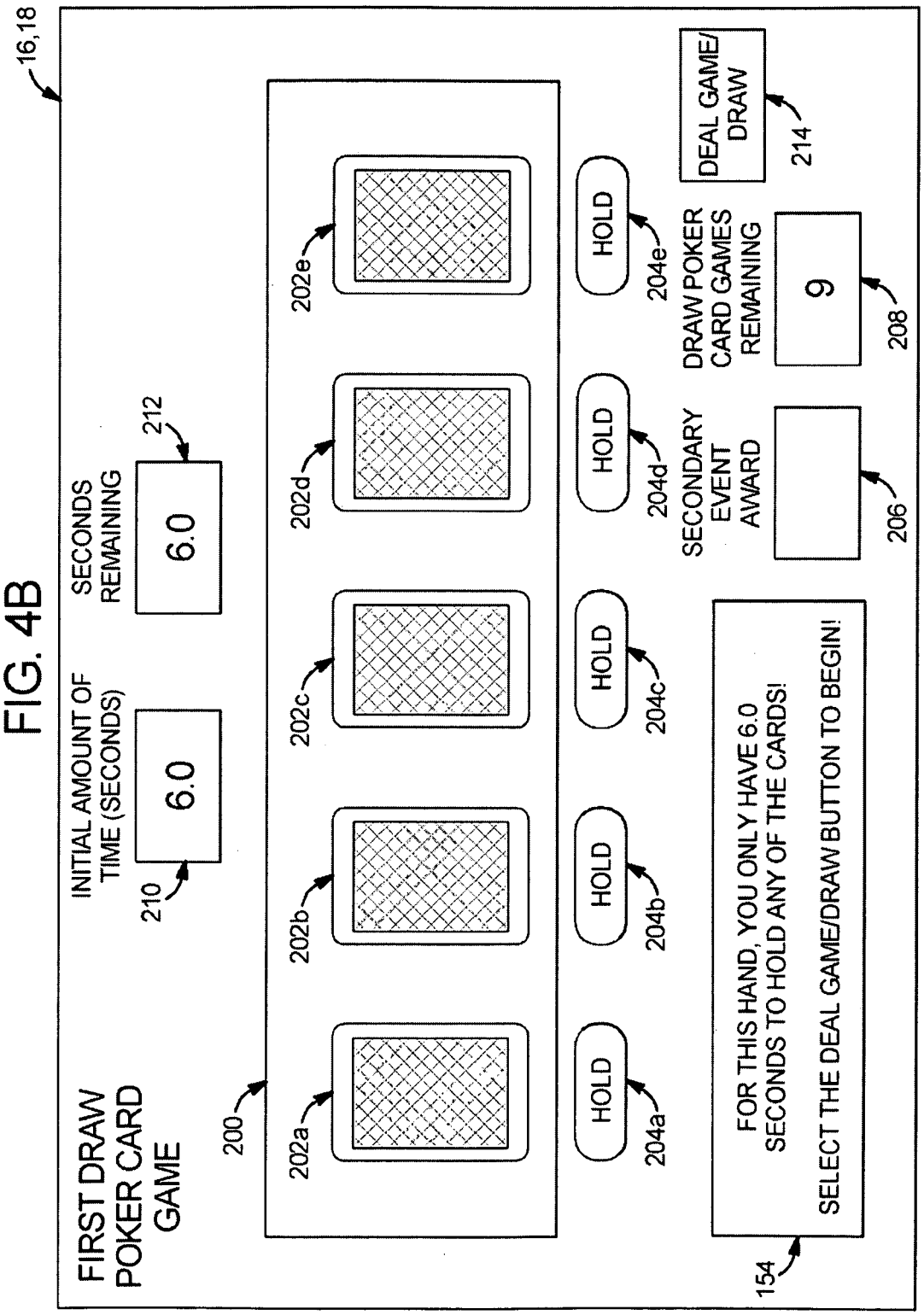

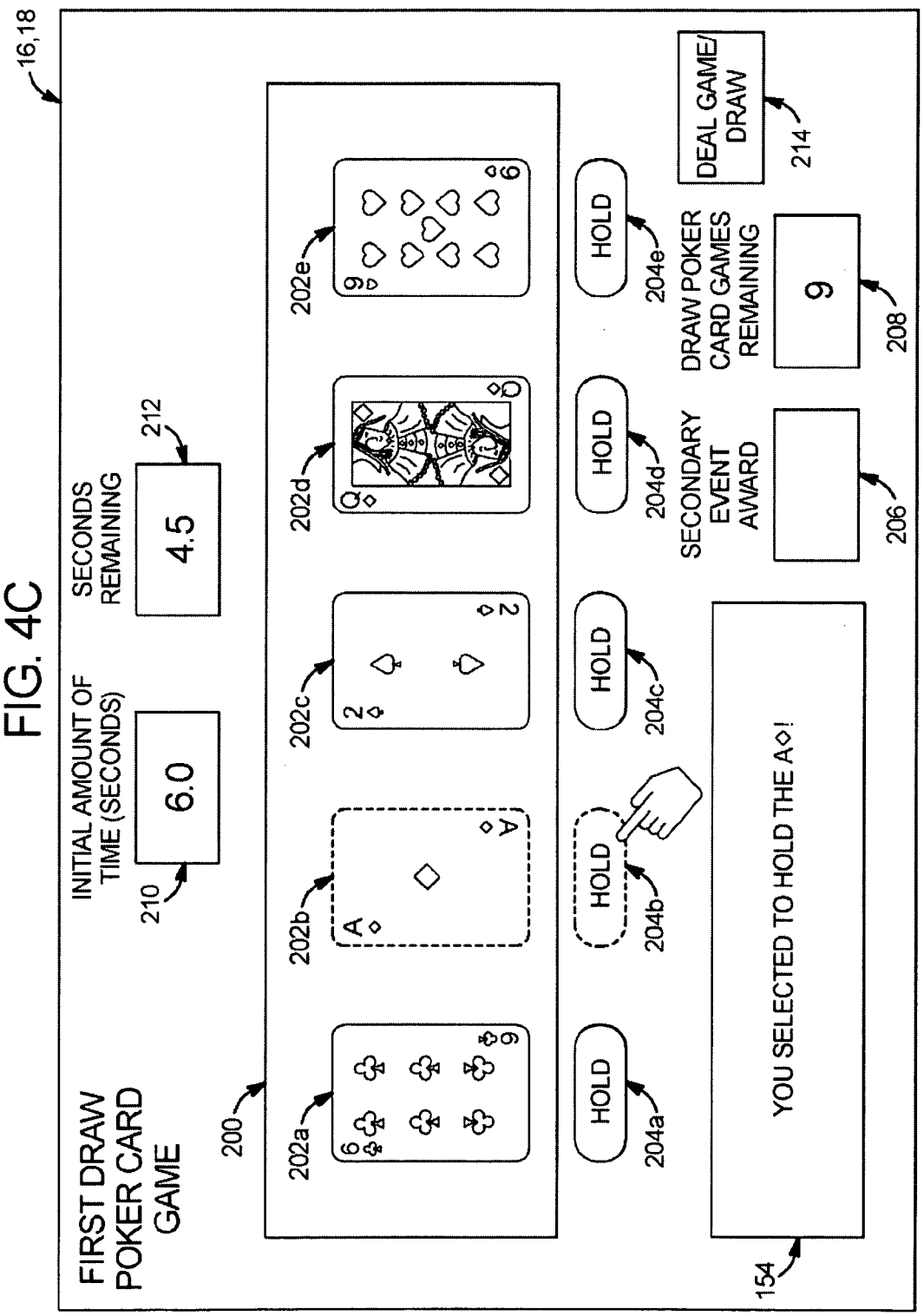

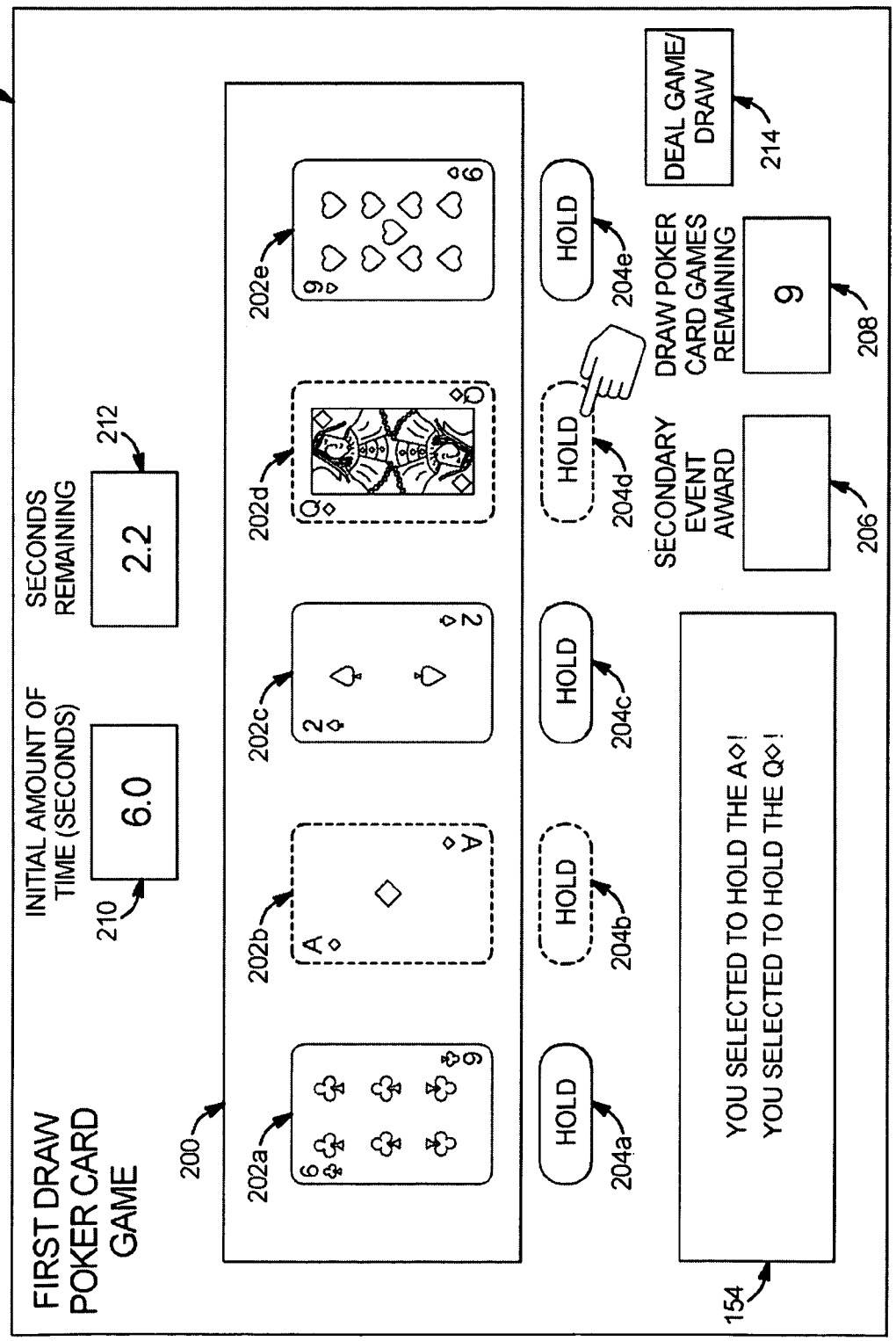

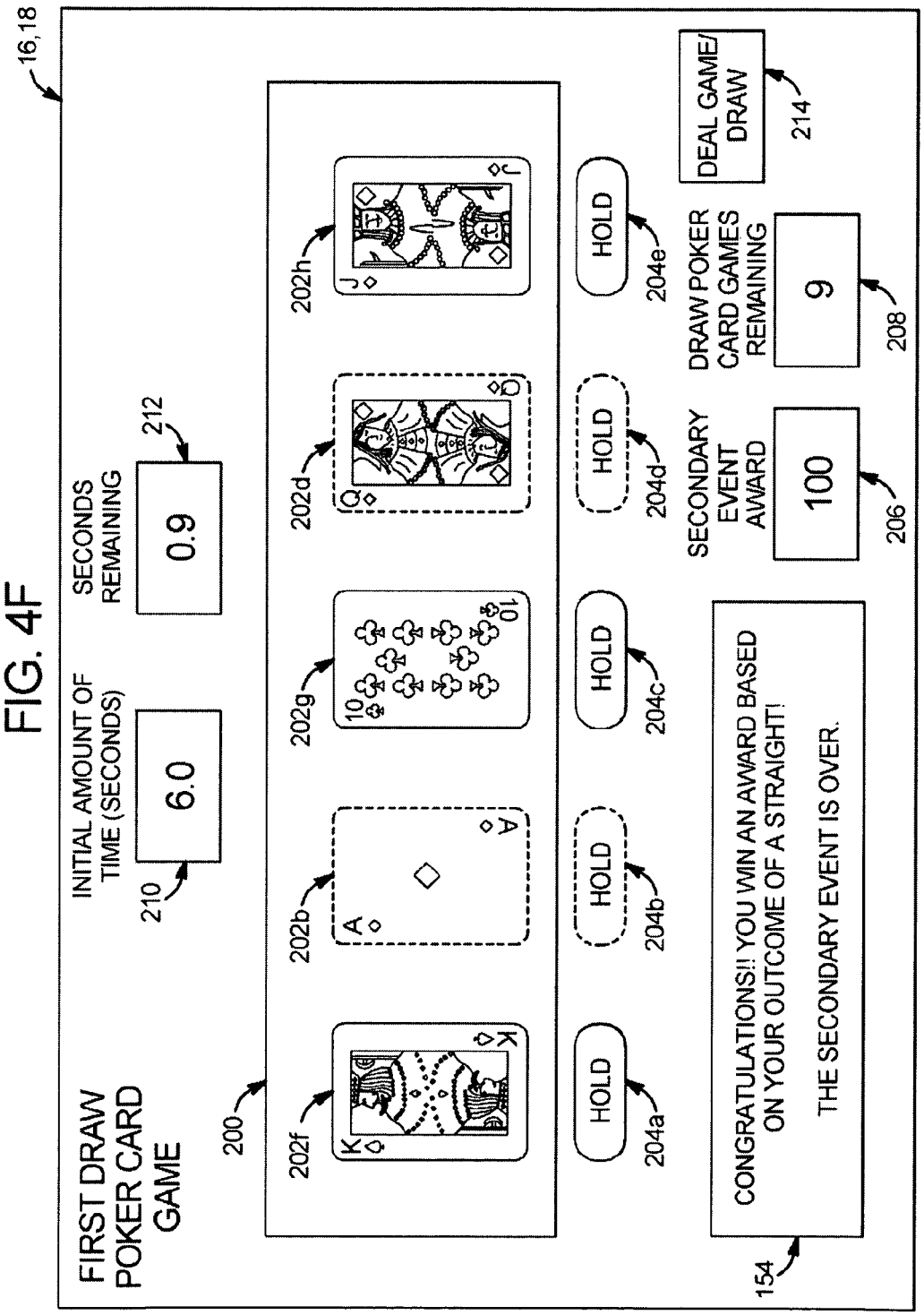

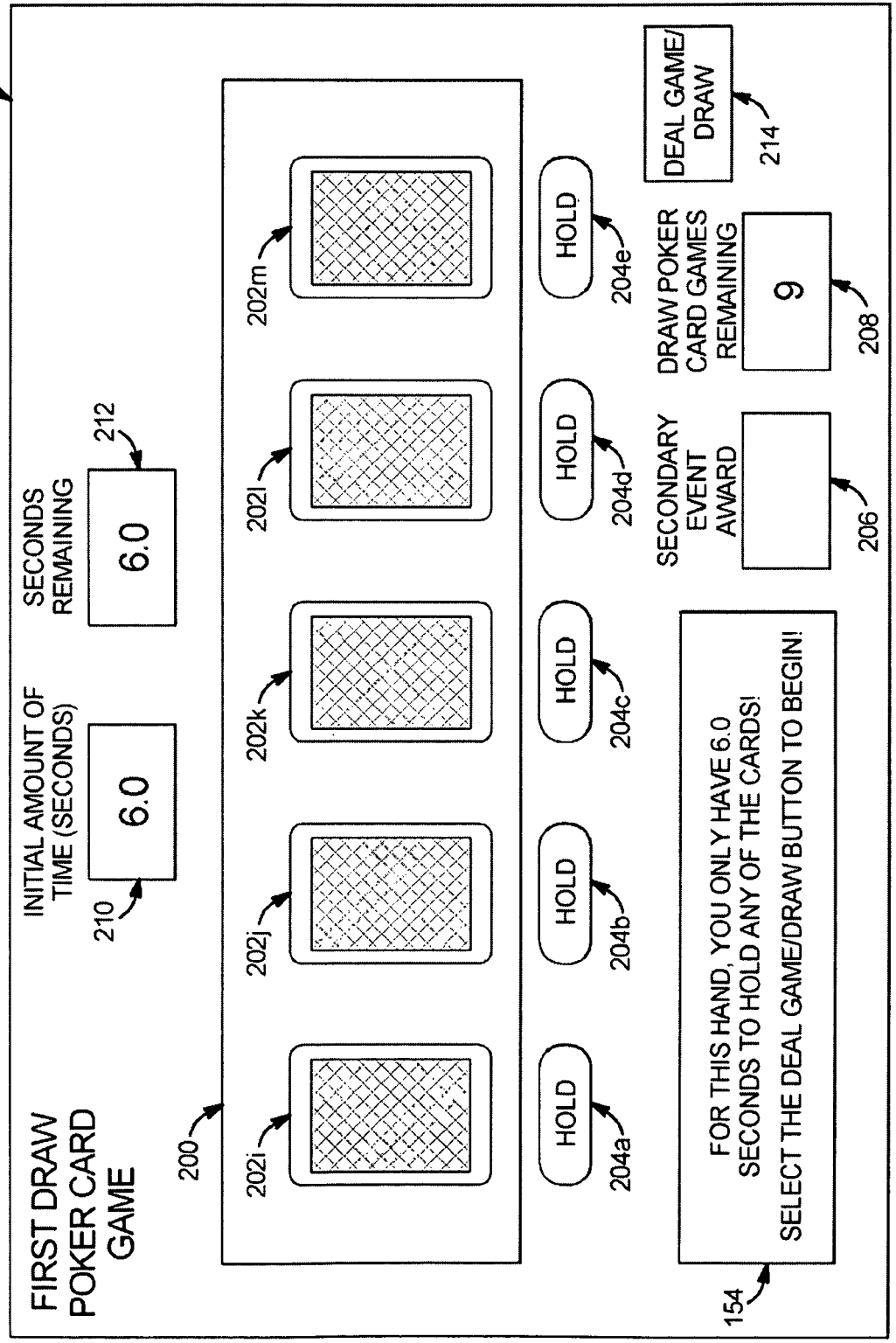

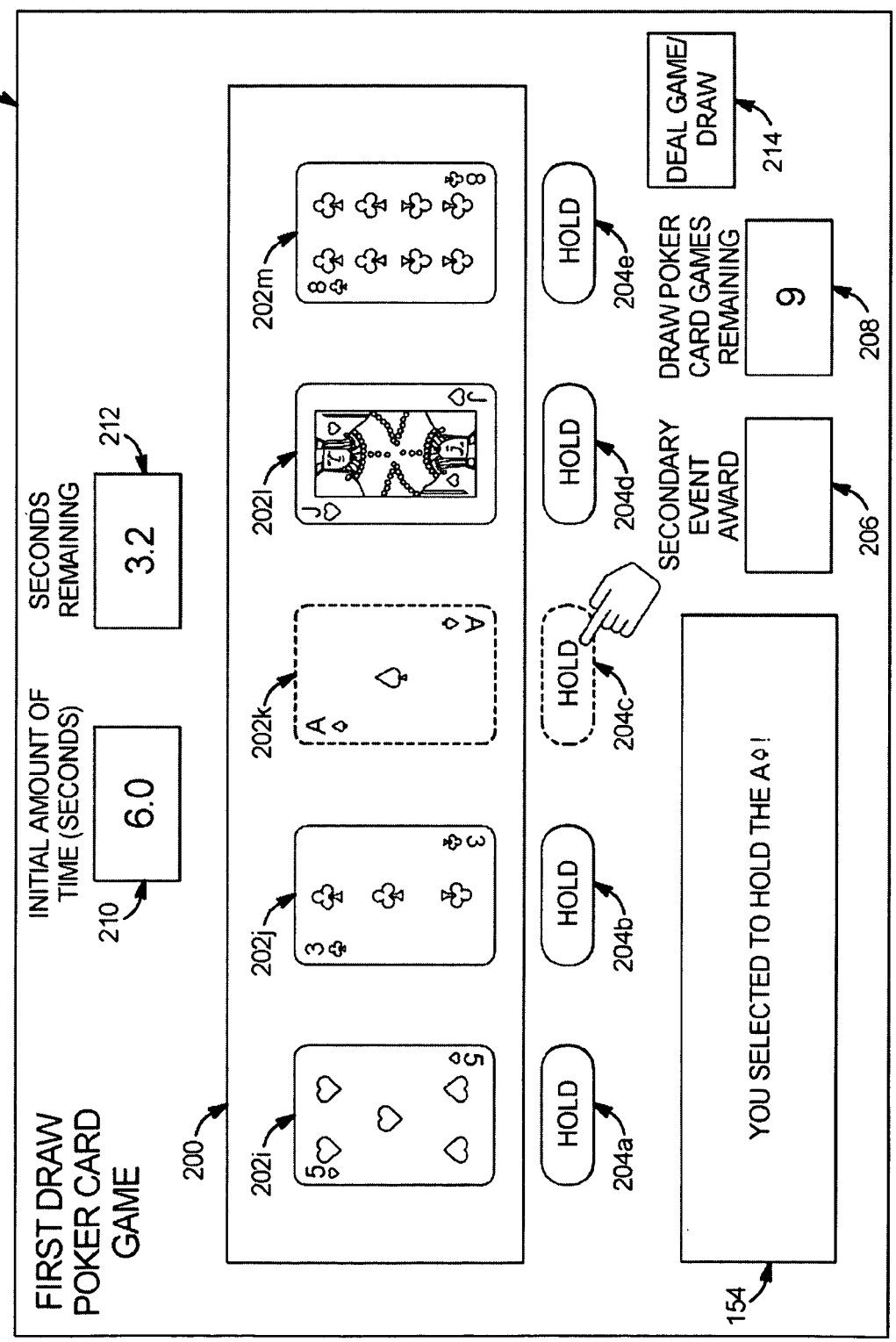

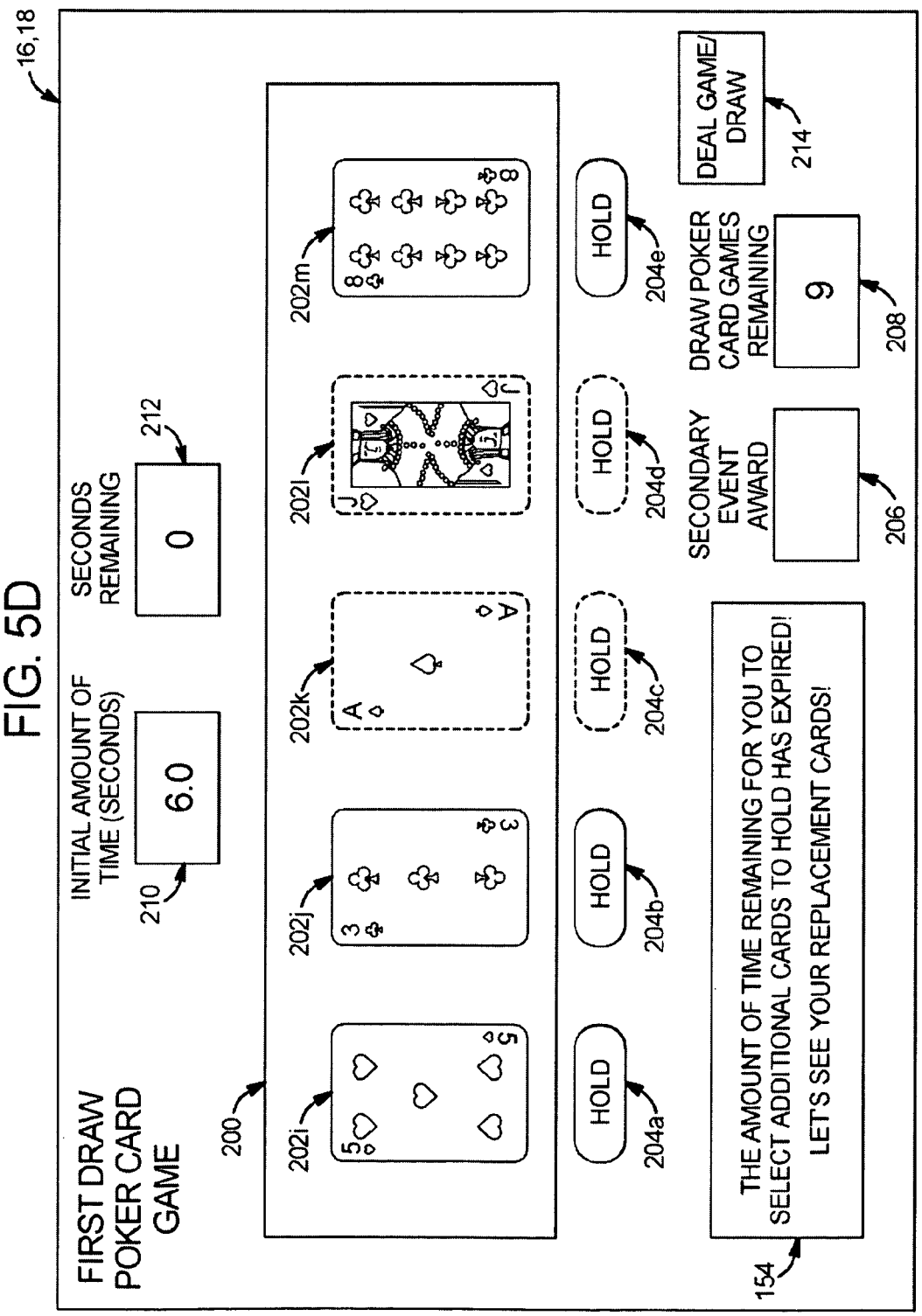

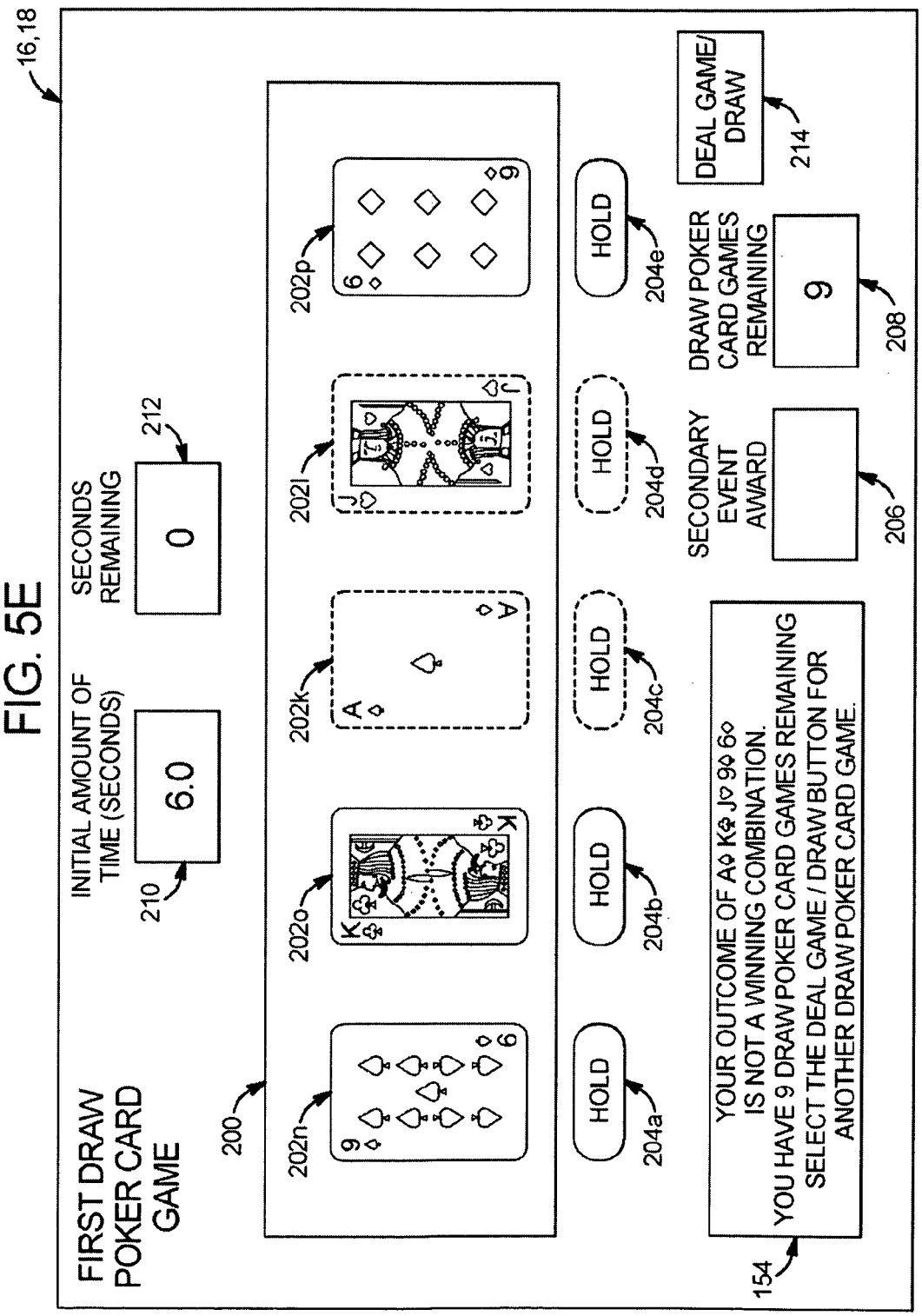

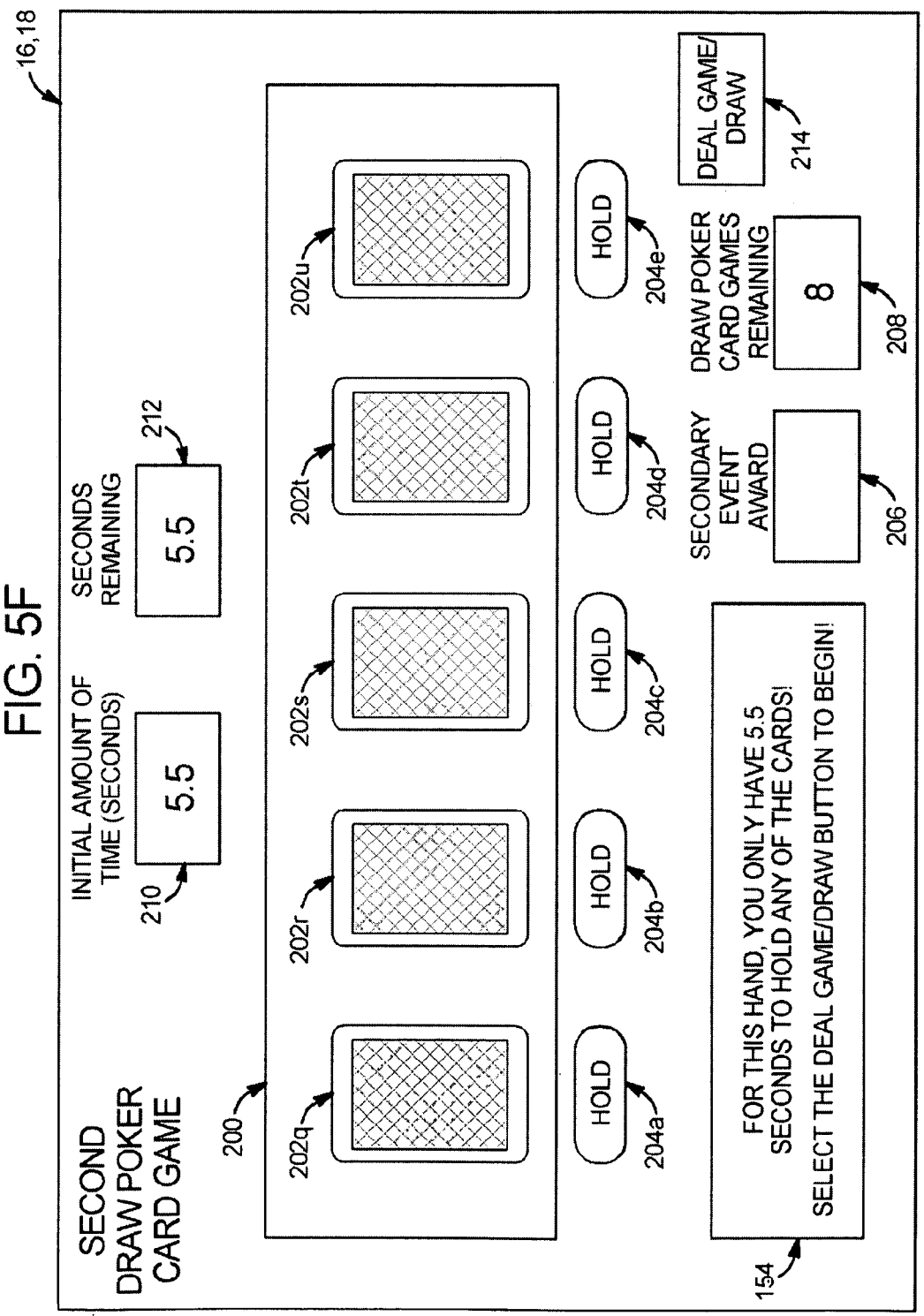

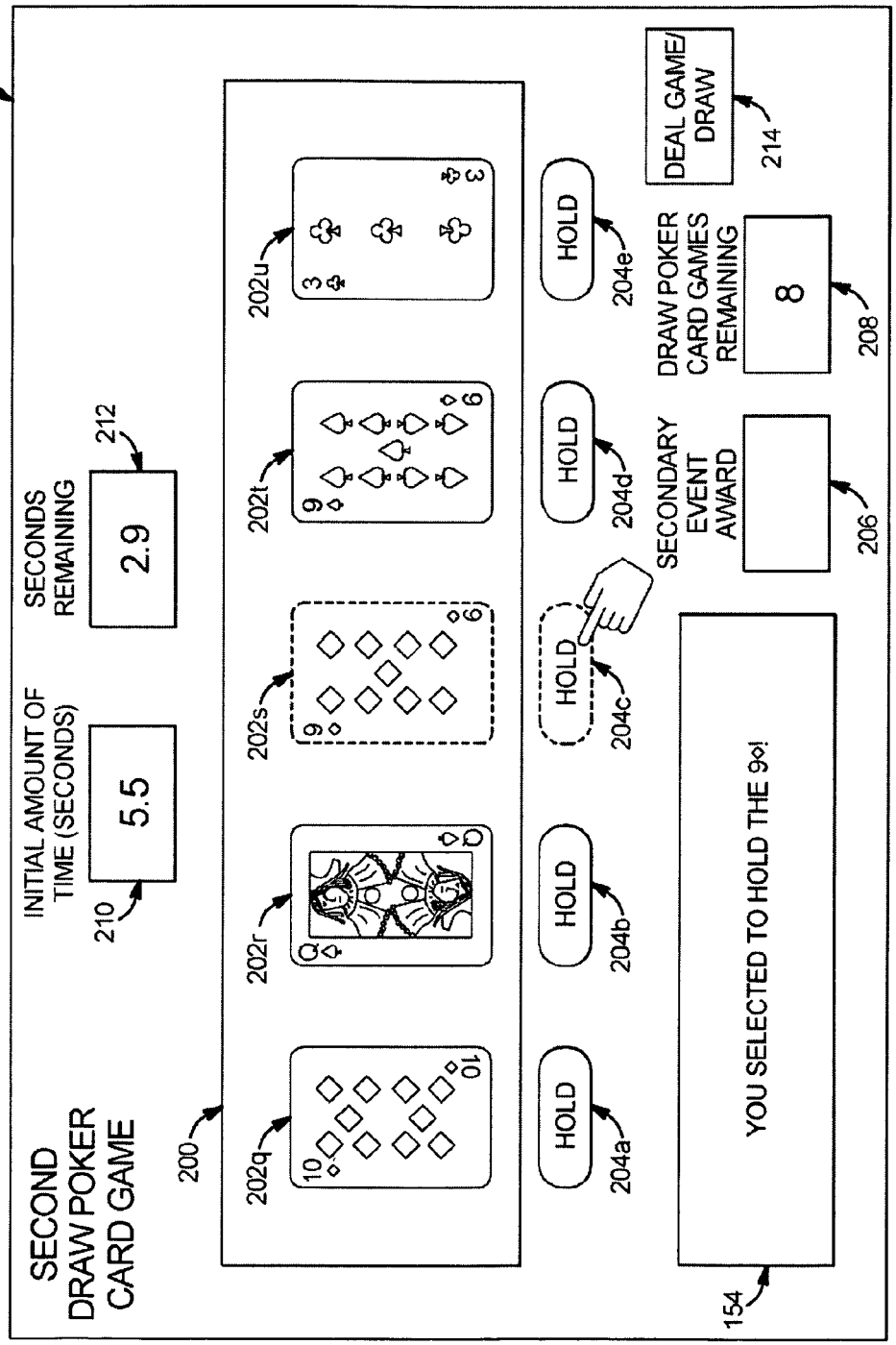

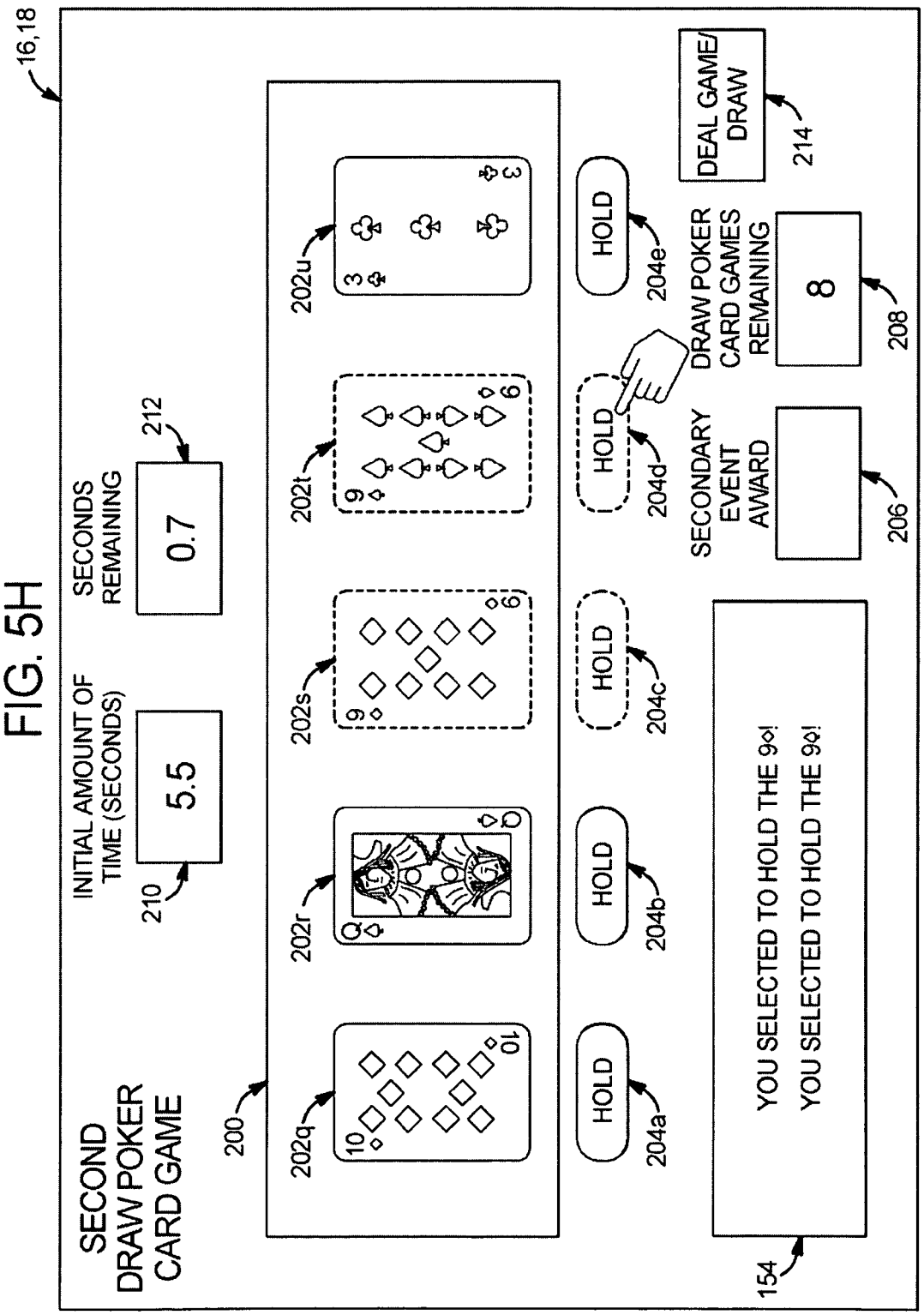

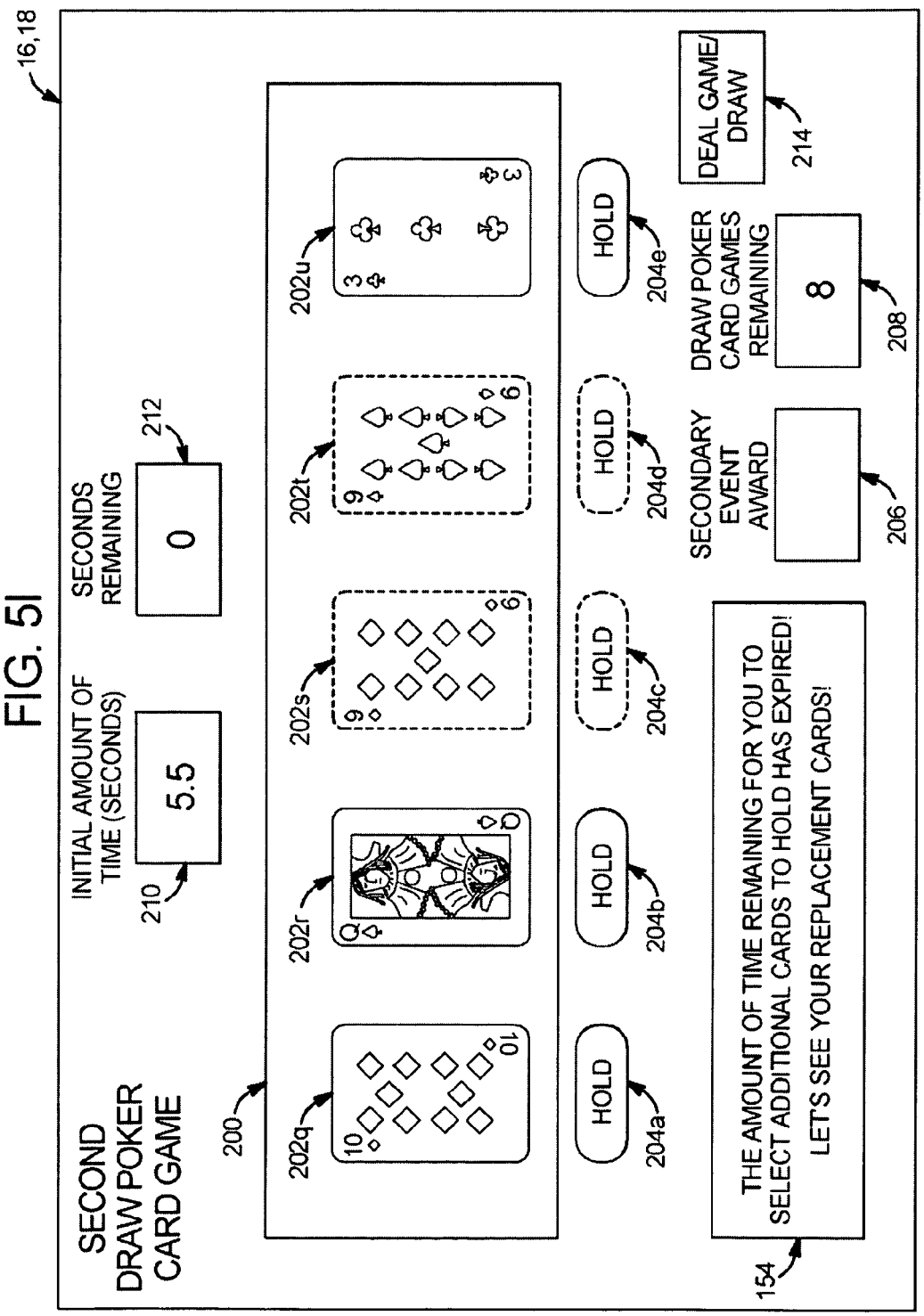

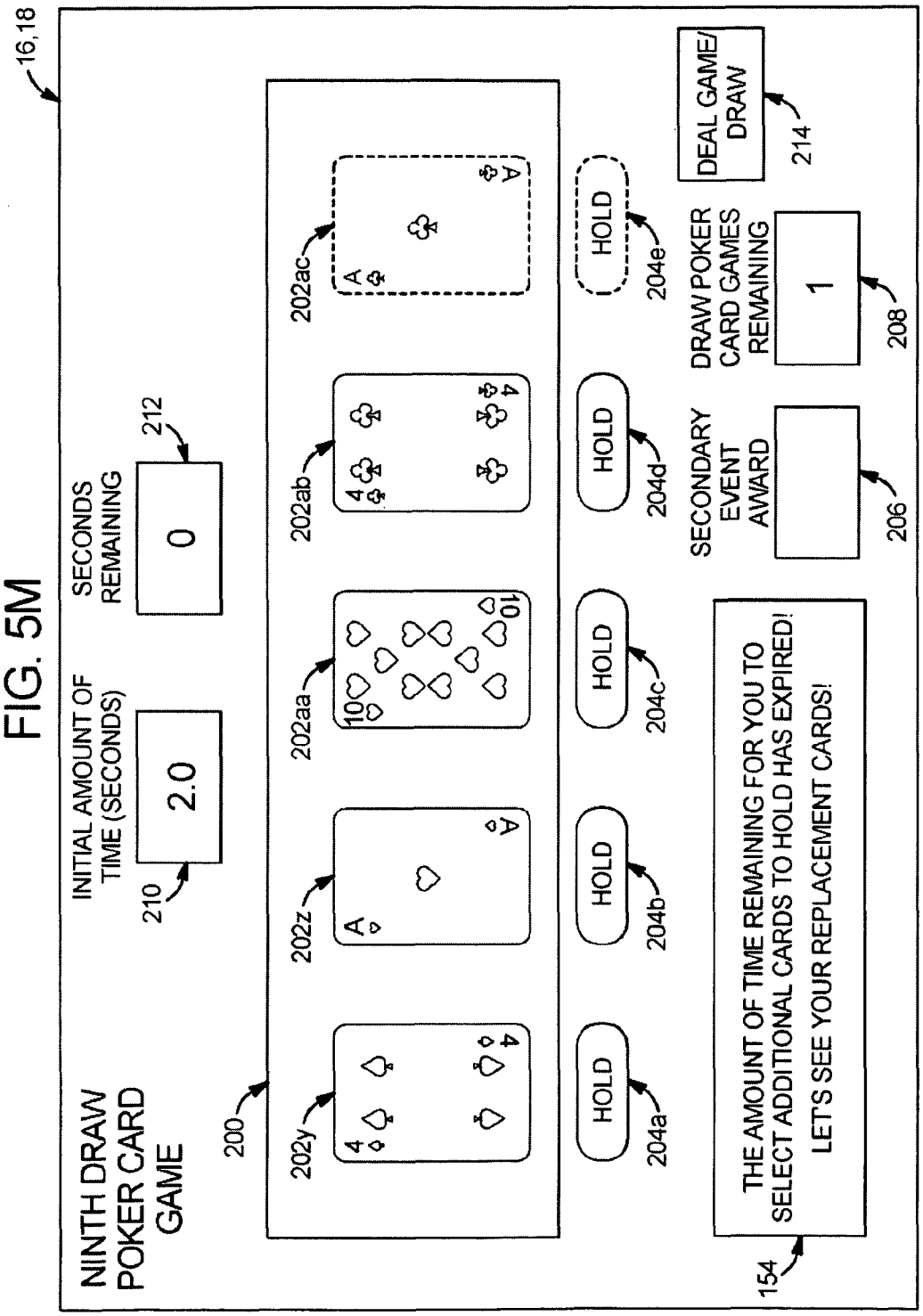

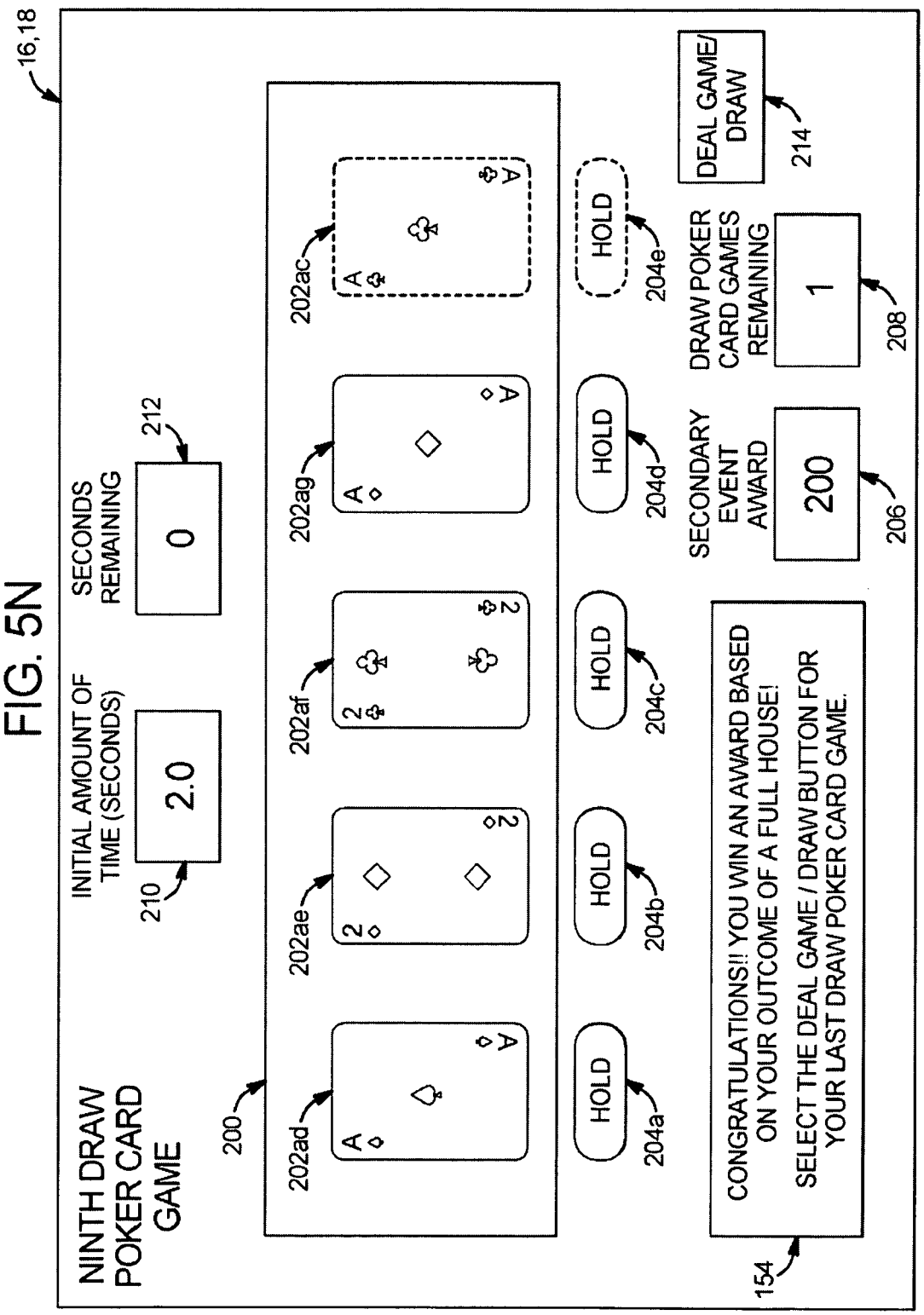

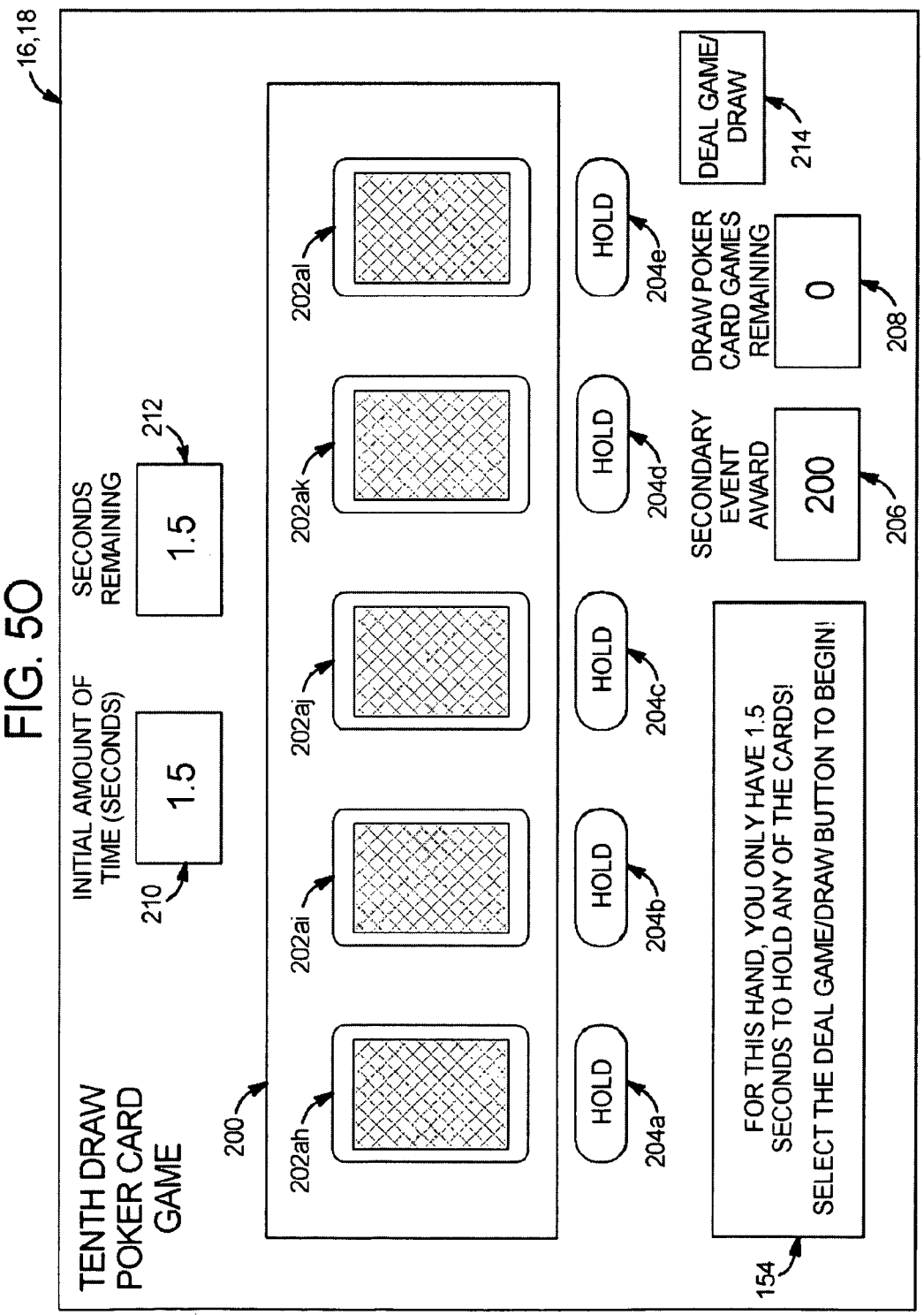

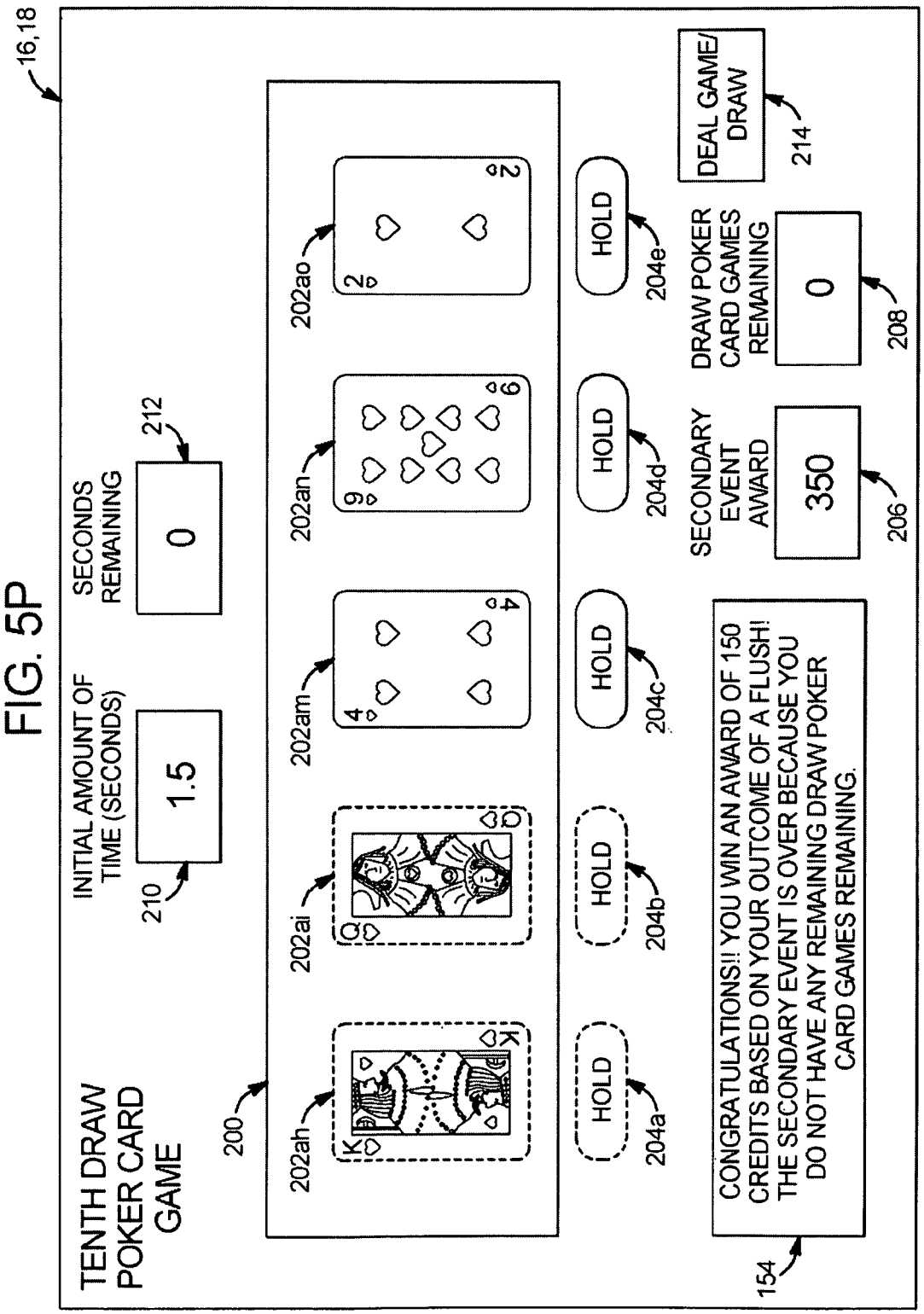

GAMING SYSTEM, GAMING DEVICE AND METHOD PROVIDING A GROUP OF TIMED GAMES

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is Five Card Draw. In general, in Five Card Draw poker the player gets five cards dealt face up from a 52 card deck of playing cards. The player can discard none, one, a plurality or all of the five cards. Each discarded card is replaced with another card from the deck. After the replacement, the cards are evaluated for winning combinations. For a five card poker game, there are ten general categories of hands, ranked from highest to lowest, as shown in Table 1 below.

TABLE 1

Ranking of Five Card Poker Hands by Category

| Rank | Name | Example |
|---|---|---|
| 1 | Royal Straight Flush | A♣ K♣ Q♣ J♣ 10♣ |
| 2 | Straight Flush | K♣ Q♣ J♣ 10♣ 9♣ |
| 3 | Four of a Kind | J♣ J♥ J♦ J♠ 3♣ |
| 4 | Full House | A♥ A♦ A♣ 6♦ 6♣ |
| 5 | Flush | A♣ J♣ 8♣ 6♣ 2♣ |
| 6 | Straight | 8♦ 7♣ 6♣ 5♠ 4♣ |
| 7 | Three of a Kind | Q♣ Q♥ Q♦ 6♦ 2♣ |
| 8 | Two Pair | 8♦ 8♥ 5♥ 5♣ 2♣ |
| 9 | One Pair | K♦ K♣ 8♣ 7♣ 2♥ |
| 10 | High Card | A♥ 10♣ 7♦ 5♠ 3♣ |

Within each category, hands are ranked according to the rank of individual cards, with an Ace being the highest card and a two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of straight flush, four of a kind, or flush, there are over a hundred equivalent hands for each two pair variation, and there are over 1,000 equivalent hands for each type of no-pair hand.

Numerous variations of poker exist, including Five Card Draw as mentioned above, Three Card Draw, and Seven Card Draw. The variations in these games generally differ in the manner in the number of cards dealt. Various criteria may also be used to determine the winning hand, including Joker cards being treated as Wild cards which substitute for any other card, highest ranking hand, lowest ranking hand (Low-Ball), and where the high and low hands each win half of the pot (High-Low).

To increase player enjoyment and excitement, it is desirable to provide players with new types of games that attract the player and keep the player entertained. Accordingly, a need exists for the further development of gaming systems, gaming devices and gaming methods.

SUMMARY

The gaming system, gaming device and gaming method disclosed herein provides a plurality of sequentially played events such as games or hands in which the player must take an action in a designated period of time and where the player has less time to take the action in one of the subsequent events, a plurality of subsequent events, or each of the subsequent events.

In one embodiment, the gaming system, gaming device and gaming method provides a group of sequentially provided draw poker card games in which the player has less time in each subsequent draw poker card game to hold cards in that game. More specifically, for each draw poker card game of the group, the gaming system displays an initial player hand from a deck of cards. The gaming system enables the player to hold zero, one or more of the cards in that initial player hand within a designated period of time. The gaming system replaces each card which is not held with another card from the deck of cards to form the final player hand for that draw poker card game. If the final player hand includes any of a plurality of predetermined winning card combinations, the gaming system provides the player an award based on that predetermined winning card combination. If the final player hand does not include any winning card combinations, the gaming system does not provide the player an award. For each subsequently displayed card game of the group, the gaming system repeats this process with a decreased amount of time for the player to hold the cards in the initial player hand for that card game. For any initial player hand of a card game in which the player does not hold cards within the designated time period for that initial player hand, the gaming system automatically replaces the cards not held in that initial player hand for that card game.

The decrease in the amount of time for the player to make a decision as to which cards to hold in each subsequent card game creates more pressure for the player to make timely decisions of which cards to hold in each game. The decreased time can accentuate the existing pressure because of the skill requirement in video poker. Such a configuration increases player excitement and enjoyment in playing the gaming system and method disclosed herein.

In one alternative embodiment, after one of the card games of the group of sequentially displayed card games includes one of the predetermined winning card combinations, no additional card games are displayed. That is, the gaming system does not display further subsequent draw poker card games remaining in the group after a displayed final hand of draw poker includes one of the predetermined winning card combinations. In a further alternative embodiment, the resulting winning card combination must be above a certain level (e.g., it must be a full house or better) to prevent the gaming system from displaying the remaining draw poker games in the group.

It should be appreciated that the amount of time may decrease with each game as indicated above or in any other regular (such as after every second hand) or irregular pattern (such as randomly determined). The amount of the decrease of time can be the same amount of time or a different amount of time for each decrease. In various alternative embodiments, the time of reduction for each displayed subsequent player hand may be based on but not limited to at least one of: (i) a percentage amount; (ii) non-linear increments of time; (iii) random increments of time; (iv) the speed of one or more previously played card games (i.e., the amount of time a player takes to hold cards); and (v) any combination of these.

The gaming system can provide the group of sequentially displayed card games as a primary wagering event or a secondary event. In one embodiment where the group is provided as a primary wagering event, the gaming system initiates the primary wagering event when the player places a wager with the gaming system. In another embodiment, the gaming system provides the group of sequentially displayed card games as a secondary or bonus event. In this embodiment, the gaming system provides the secondary event upon any suitable triggering event. In one example embodiment, the triggering event occurs when the player accumulates a designated amount of primary game winning combinations. In another example embodiment, the triggering event is based on a number of predetermined generated symbols in the play of a primary game.

The gaming system determines the number of sequentially displayed card games of the group to provide to the player in any suitable manner or based on any suitable criteria. For example, the number of card games in the group is based on a triggering event. In one such embodiment, the number of card games in the group is based on which predetermined symbol combination generated in a play of a primary game triggered the play of the card games.

It should be appreciated that the awards based on the predetermined winning card combinations displayed in the final player hand of each card game can be any suitable awards. In one embodiment, each award is an amount of credits.

It should be appreciated that while the present application primarily discusses the draw poker games as the primary embodiment, the present disclosure is not limited to this embodiment, and extends to any card or any multi-stage game where the player is required to make an input of a decision.

The gaming system, gaming device and gaming method disclosed herein thus provides the player with a new and exciting game that provides a group of sequentially displayed events in which the player must make progressively quicker decisions for the later displayed events. Such a configuration increases player excitement and enjoyment in playing the gaming system and method disclosed herein.

Additional features and advantages are described herein, and will be apparent from the following Detailed Description and figures.

BRIEF DESCRIPTION OF THE FIGURES

FIG. 3 is a flowchart of operation of one embodiment of the gaming system disclosed herein, illustrating an example of enabling the player to hold zero, one or more of a plurality of cards from the displayed initial player hand of a draw poker card game within a designated period of time, wherein for each subsequently provided draw poker card game, the designated period of time for the player to hold cards is decreased for the displayed initial player hand of the subsequently provided draw poker card game.

FIGS. 4A, 4B, 4C, 4D, 4E, and 4F are front views of one embodiment of the displays of the gaming system disclosed herein, illustrating the player holding a plurality of cards from the displayed initial player hand of a draw poker card game within a designated period of time, wherein the secondary event ends after the gaming system provides the award based on the predetermined winning combination.

FIGS. 5A, 5B, 5C, 5D, 5E, 5F, 5G, 5H, 5I, 5J, 5K, 5L, 5M, 5N, 5O, and 5P are front views of one embodiment of the displays of the gaming system disclosed herein, illustrating the player holding zero, one or more of a plurality of cards for each displayed initial player hand of a draw poker card game within a designated period of time, wherein for each displayed initial player hand of the subsequently provided draw poker card game, the designated period of time is decreased.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
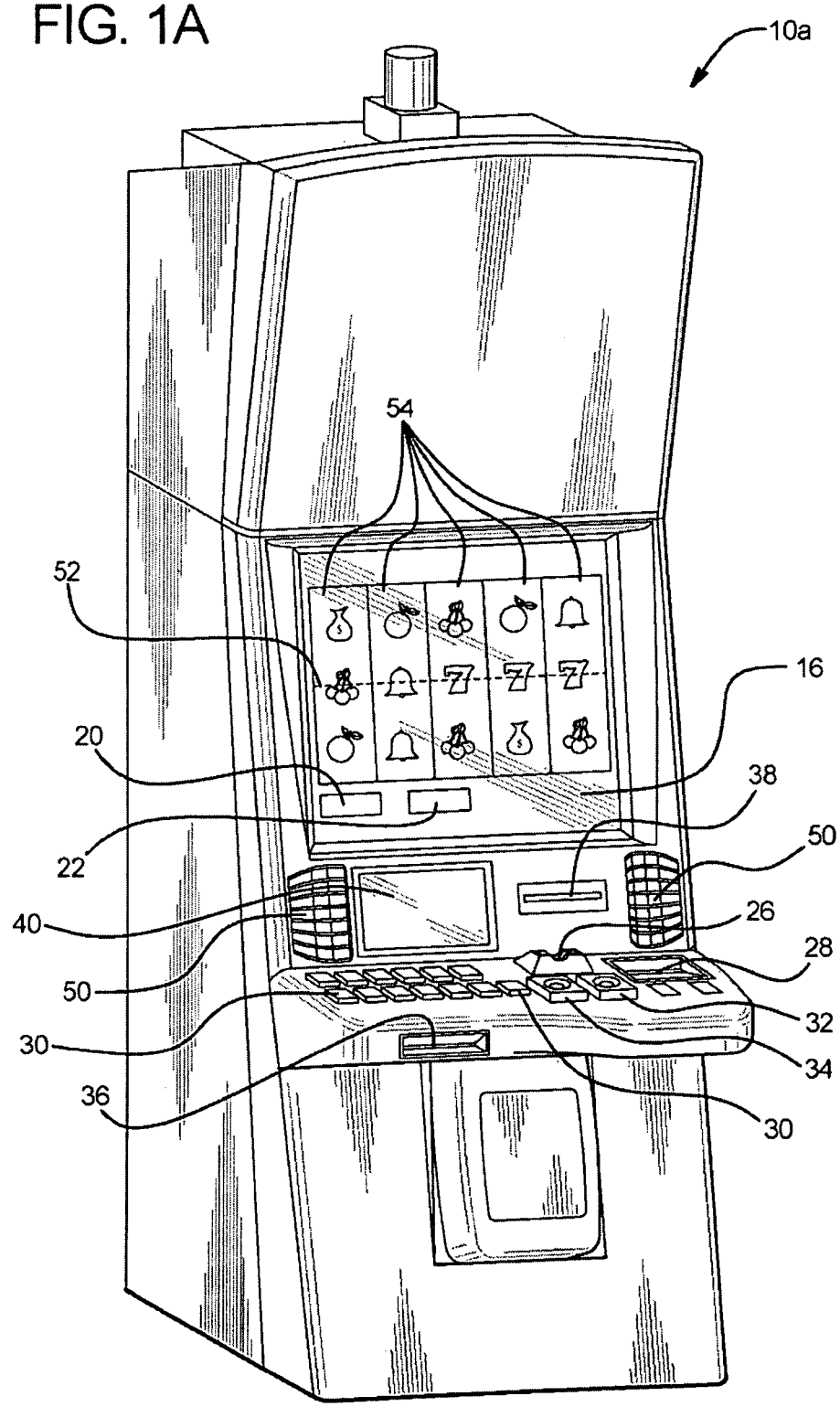
FIGS. 1A and 1B are front perspective views of alternative embodiments of gaming systems disclosed herein.
Figure 1B:
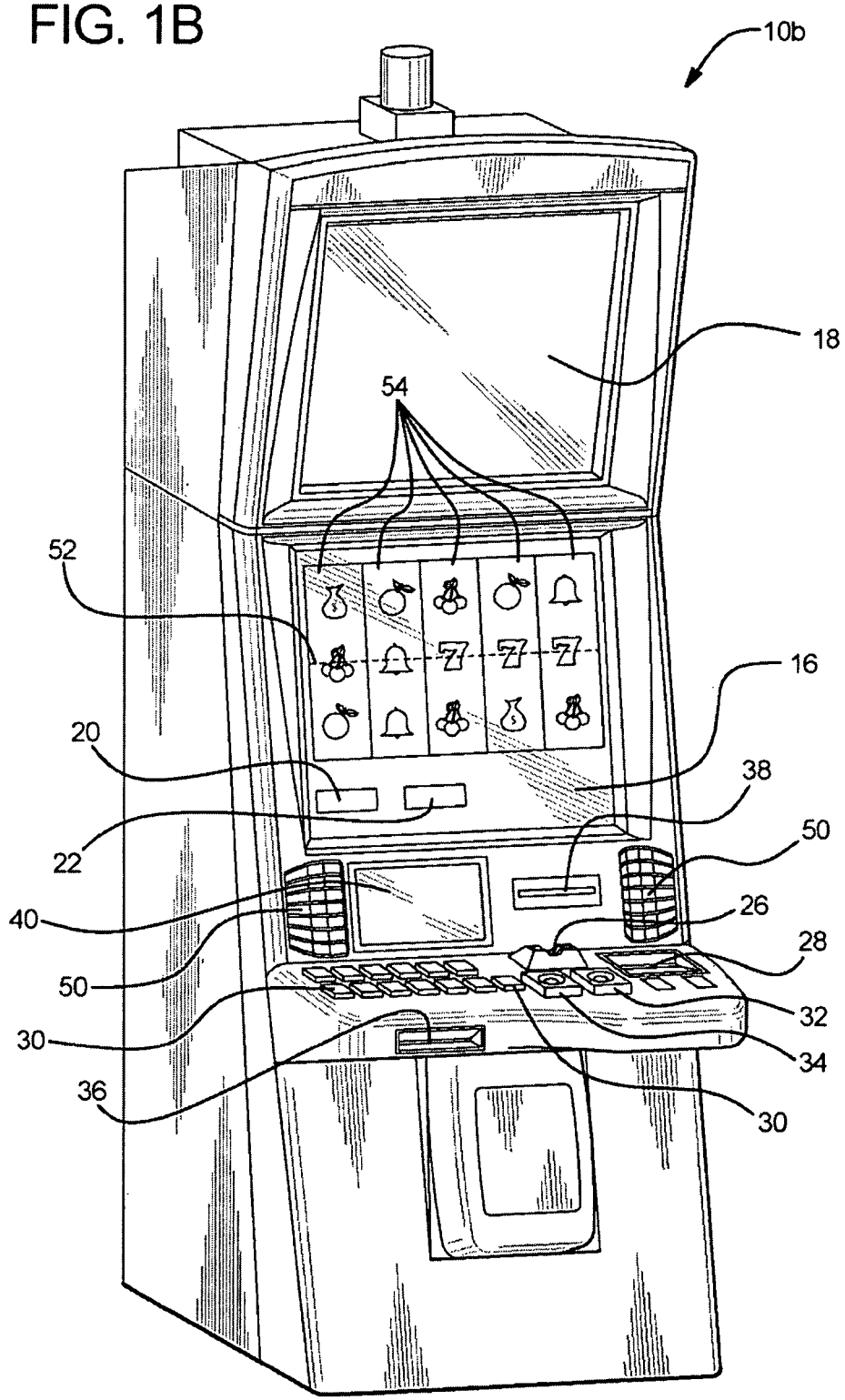

Referring now to the drawings, two example alternative embodiments of a gaming device disclosed herein are illustrated in FIGS. 1A and 1B as gaming device 10a and gaming device 10b, respectively. Gaming device 10a and/or gaming device 10b are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
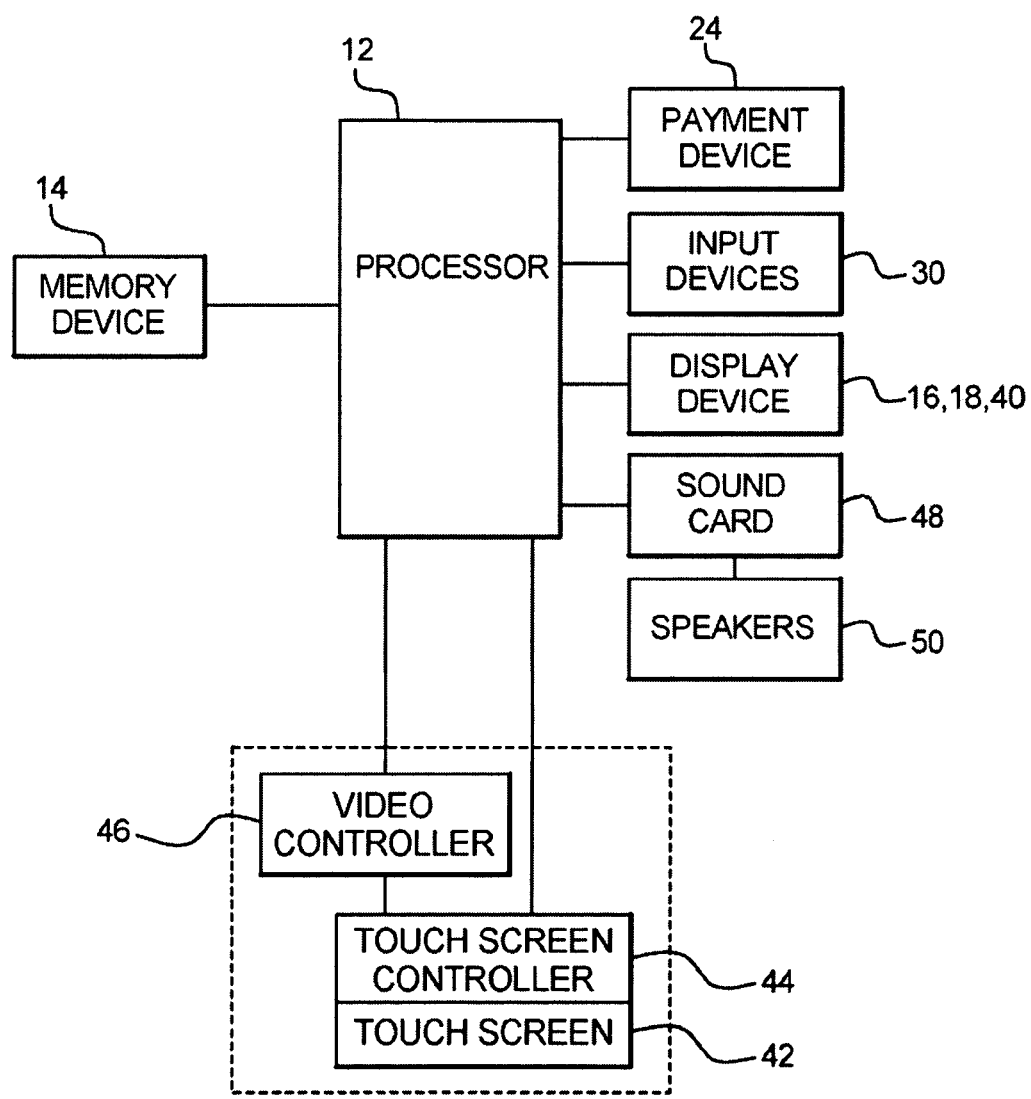
FIG. 2A is a schematic block diagram of the electronic configuration of one embodiment of a gaming system disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode; In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
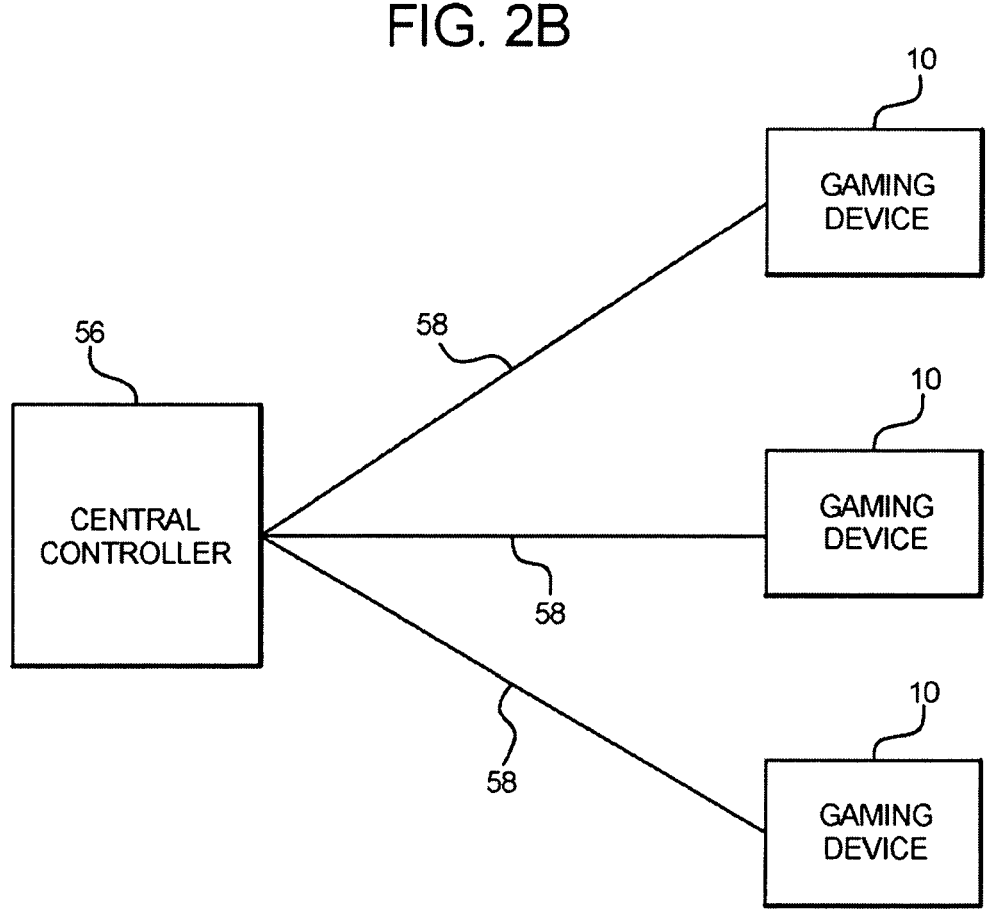
FIG. 2B is a schematic diagram of the central server in communication with a plurality of gaming systems in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed, to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified players gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the players surname, the players preferred name, the player's player tracking ranking, any promotion status associated with the player's player tracking card, the players address, the players birthday, the players anniversary, the players recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game.

That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Draw Poker Example Embodiments

FIG. 3 illustrates one embodiment of the method of the present disclosure which provides a secondary event in the form of a group of sequentially displayed draw poker card games in which the player is enabled to hold zero, one or more cards within a designated period of time for each displayed draw poker card game. The player has less time to hold zero, one or more cards for each displayed subsequent draw poker card game. In this example embodiment, the secondary event ends after a displayed final player hand of a draw poker card game includes a predetermined winning card combination which is above a certain level.

More specifically, the gaming system enables a player to place a wager to initiate a play of a primary game upon the placement of the wager as indicated by block 102. The gaming system displays the play of the primary game and determines an outcome for the primary game as indicated by block 104. The gaming system provides any awards associated with the primary game outcome as indicated by block 106.

As indicated by decision diamond 108, the gaming system determines whether a secondary event triggering event has occurred. If the gaming system determines that a secondary event triggering event has occurred, the gaming system determines a number of sequentially displayed draw poker games of a group to provide to the player wherein each draw poker card game has an initial player hand and a final player hand, and wherein the designated period of time decreases for each subsequently displayed draw poker card game as indicated by block 110. The gaming system displays a meter which indicates the number of draw poker card games to provide to the player. For the initial player hand of a draw poker card game, the gaming system determines a designated period of time for the player to hold zero, one or more cards as indicated by block 112.

The gaming system displays, from a deck of cards, an initial player hand of a draw poker card game from the group of provided draw poker card games as indicated by block 114. After the gaming system displays an initial player hand, the gaming system enables the player to hold zero, one or more of a plurality of cards from the displayed initial player hand within the designated period of time for that displayed initial player hand as indicated by block 116. In one example embodiment, the gaming system enables the player to hold a plurality of the cards within six seconds. In this example embodiment, when the six seconds expire, the player is no longer enabled to hold any additional cards (or change a card held to be not held).

The gaming system then displays the final player hand of a displayed draw poker card game by replacing each card not held with another card from the deck of cards as indicated by block 118. As indicated by decision diamond 120, the gaming system determines whether the displayed final player hand includes any of the predetermined winning card combinations. In one embodiment, the predetermined winning card combinations are the winning card combinations of a conventional draw poker card game.

If the gaming system determines that the displayed final player hand includes any predetermined winning card combinations, the gaming system provides any awards based on the predetermined winning card combination as indicated by block 122.

In this illustrated embodiment, the gaming system determines whether the predetermined winning card combination is above a certain level (i.e., a full house or better) as indicated by decision diamond 124. If the gaming system determines that the predetermined winning card combination is above this level, the gaming system ends the secondary event as indicated by block 126. If the gaming system determines that the predetermined wining card combination is not above this level, or that the displayed final player hand does not include a predetermined winning combination, the gaming system determines whether the remaining number of draw poker card games to provide to the player is equal to a designated number as indicted by decision diamond 128.

If the gaming system determines that the remaining number of draw poker card games to provide to the player is equal to a designated number, the gaming system ends the secondary event as indicated by block 126. If the gaming system determines that the remaining number of draw poker card games is not equal to the designated number, the gaming system decreases the remaining number of draw poker card games to provide to the player as indicated by block 130. In one embodiment, the designated level is zero. For each displayed subsequent draw poker card game, the gaming system repeats this process, starting at block 114.

In one alternative embodiment, the gaming system does not determine whether the predetermined winning card combination is above a certain level. In one such embodiment, the gaming system ends the secondary event after the gaming system determines that the displayed final player hand includes any predetermined winning card combinations and provides the player any awards based on the predetermined winning card combination.

In another alternative embodiment, the gaming system determines whether the remaining number of draw poker card games to provide to the player equals a designated number after the gaming system determines that the displayed final hand includes a predetermined winning card combination and provides the player any awards based on that predetermined winning card combination. That is, the gaming system does not end the secondary event after the gaming system provides any awards based on the predetermined winning card combination. In other words, the gaming system provides a designated amount of draw poker card games wherein for each draw poker card game, the final player hand may include a predetermined winning card combination.

After the gaming system ends the secondary event, or if the gaming system determines that the secondary event triggering event did not occur, the gaming system determines whether any credits remain as indicated by decision diamond 134. If there are credits remaining, the gaming system repeats the process starting at block 102. The player, therefore, has the opportunity to place another wager to initiate another play of the primary game. If there are no credits remaining, the process ends as indicated by oval 112.

Referring now to FIGS. 4A to 4F, this example embodiment generally shows an example illustrating the player holding a plurality of cards within a designated period of time for the displayed initial player hand. In this example embodiment, the secondary event ends after the gaming system provides an award based on a predetermined winning combination.

As illustrated in FIG. 4A, the gaming system includes a display device 16 or 18 that displays a primary game, and more particularly a slot game, which includes a plurality of reels 54a, 54b, 54c, 54d and 54e. In this example, the reels include a plurality of symbols 150a to 150o.

The display device 16 or 18 includes a credit meter 152. The credit meter 152 displays how much money (i.e., credits) has been deposited by the player, minus how much money has been wagered by the player, plus how much money has been won by the player. FIG. 4A illustrates a game play in which the player had previously accumulated (i.e., before the current primary game play illustrated in FIG. 4A) 155 credits as indicated by the credit meter 152.

In FIG. 4A, the generated symbols include a secondary event triggering event (i.e., the generation of the "BONUS" symbol). The "BONUS" symbol 150h on reel 54c triggers a secondary event which causes the gaming system to provide a group of sequentially displayed draw poker card games. The gaming system determined to provide the player a group including ten sequentially displayed draw poker card games, wherein each draw poker card game includes an initial player hand and a final player hand. The display device 16 or 18 displays an audio, visual, or audiovisual message 154 informing the player of the secondary event award of the group including ten draw poker card games. An appropriate message such as "CONGRATULATIONS! THE SECONDARY EVENT BEEN TRIGGERED! THE SECONDARY EVENT PROVIDES YOU WITH 10 DRAW POKER CARD GAMES! LET'S SEE YOUR FIRST INITIAL PLAYER HAND!" is provided to the player visually, such as in the message display 154, or through suitable audio or audiovisual displays.

FIG. 4B illustrates the first displayed initial player hand 200 of a draw poker card game from the provided group of subsequently displayed draw poker card games. The gaming system includes a display device 16 or 18 that displays, from a deck of cards, the first draw poker card game from the group. The first displayed draw poker card game includes an initial player hand 200 which includes a plurality of cards 202a, 202b, 202c, 202d and 202e. In this example, the gaming system displays the card values after the player selects the deal game/draw button.

The display device 16 or 18 displays a plurality of hold card inputs 204a, 204b, 204c, 204d and 204e. During the play of a game of draw poker, the player is enabled to hold zero, one or more of the of the plurality of cards 202a, 202b, 202c, 202d and 202e by selecting one of the hold card inputs 204a, 204b, 204c, 204d, 204e, respectively. For example, if the player selects the hold card input 204c, the gaming system holds card 202c for the displayed initial player hand of the draw poker card game.

The display device 16 or 18 displays a deal game/draw button 214. During the play of a displayed initial player hand of a draw poker card game, the selection of the draw button 214 causes the processor to replace each card not held with another card from the deck of cards. That is, the player is enabled to select the deal game/draw button 214 rather than wait for the designated period to time to expire for the displayed initial player hand. The player is also enabled to the select the deal game/draw button 214 after the gaming system displays the final player hand of a draw poker card game if the remaining number of draw poker card games to provide to the player is not equal to a designated number. In this example, the designated number is zero. That is, the player is enabled to select the deal game/draw button 214 if the remaining number of draw poker card games is greater than zero and the displayed final player hand does not include a predetermined winning card combination. Such a selection causes the gaming system to decrease the remaining number of draw poker card games to provide to the player and display a subsequent draw poker card game.

The display device 16 or 18 displays a draw poker card games remaining meter 208. The draw poker card games remaining meter 208 indicates the number of subsequent draw poker card games remaining to be displayed to the player. In FIG. 4A, the total number of draw poker card games remaining is nine, as indicated by the draw poker card games remaining meter 208.

The display device 16 or 18 displays a secondary event award display 206 which indicates how many credits the player is awarded based on any winning combination for a displayed final player hand of a draw poker card game.

The display device 16 or 18 displays an initial amount of time display 210 which indicates the initial designated period of time the player can hold zero, one or more cards for the displayed initial player hand of a draw poker card game. In this example embodiment, when the player secondary event triggering event occurred, the gaming system determined a designated period for the player to hold zero, one or more cards for the displayed initial player hand. As illustrated by the initial amount of time display 210, the gaming system determined, for the first displayed initial player hand, that the player has six seconds to hold zero, one or more cards. The gaming system determined that for each subsequently displayed draw poker card game, the designated period of time for the player to hold zero, one or more cards is decreased by a half of a second.

The display device 16 or 18 displays a time remaining meter 212 which indicates the period of time left for the player to hold zero, one or more of the cards for the displayed initial player hand. In this example, when the time remaining meter 212 expires (i.e., indicates zero seconds) the player is unable to hold any remaining cards not held.

An appropriate message such as "FOR THIS HAND, YOU ONLY HAVE 6.0 SECONDS TO HOLD ANY OF THE CARDS! SELECT THE DEAL GAME/DRAW BUTTON TO BEGIN!" is provided to the player visually, such as in the message display 154, or through suitable audio or audiovisual displays.

As illustrated in FIG. 4C, after the player selects the deal game/draw button, the gaming system displays the first displayed initial player hand including 6♣ A♦ 2♠ Q♦ 9♥ and the designated period of time begins to decrease. In this example, the player holds the second card 202b which is an A♦, by selecting the hold card input 204b (as indicated by the dashed lines). The time remaining meter 212 indicates the player has 4.5 seconds remaining for the player to hold additional cards. An appropriate message such as "YOU SELECTED TO HOLD THE A♦!" is provided to the player visually, such as in the message display 154, or through suitable audio or audiovisual displays. It should be appreciated that most draw poker gaming systems do not provide such a message to the player, and that in this example such a message is displayed for illustrative purposes.

As illustrated in FIG. 4D, the player holds the fourth card 202d which is a Q♦, by selecting the hold card input 204d (as indicated by the dashed lines). The time remaining meter 212 indicates that the player has 2.2 seconds remaining for the player to hold additional cards. An appropriate message such as "YOU SELECTED TO HOLD THE A♦! YOU SELECTED TO HOLD THE Q♦!" is provided to the player visually, such as in the message display 154, or through suitable audio or audiovisual displays. Again, it should be appreciated that most draw poker gaming systems do not provide such a message to the player, and that in this example such a message is displayed for illustrative purposes.

Figure 4E:
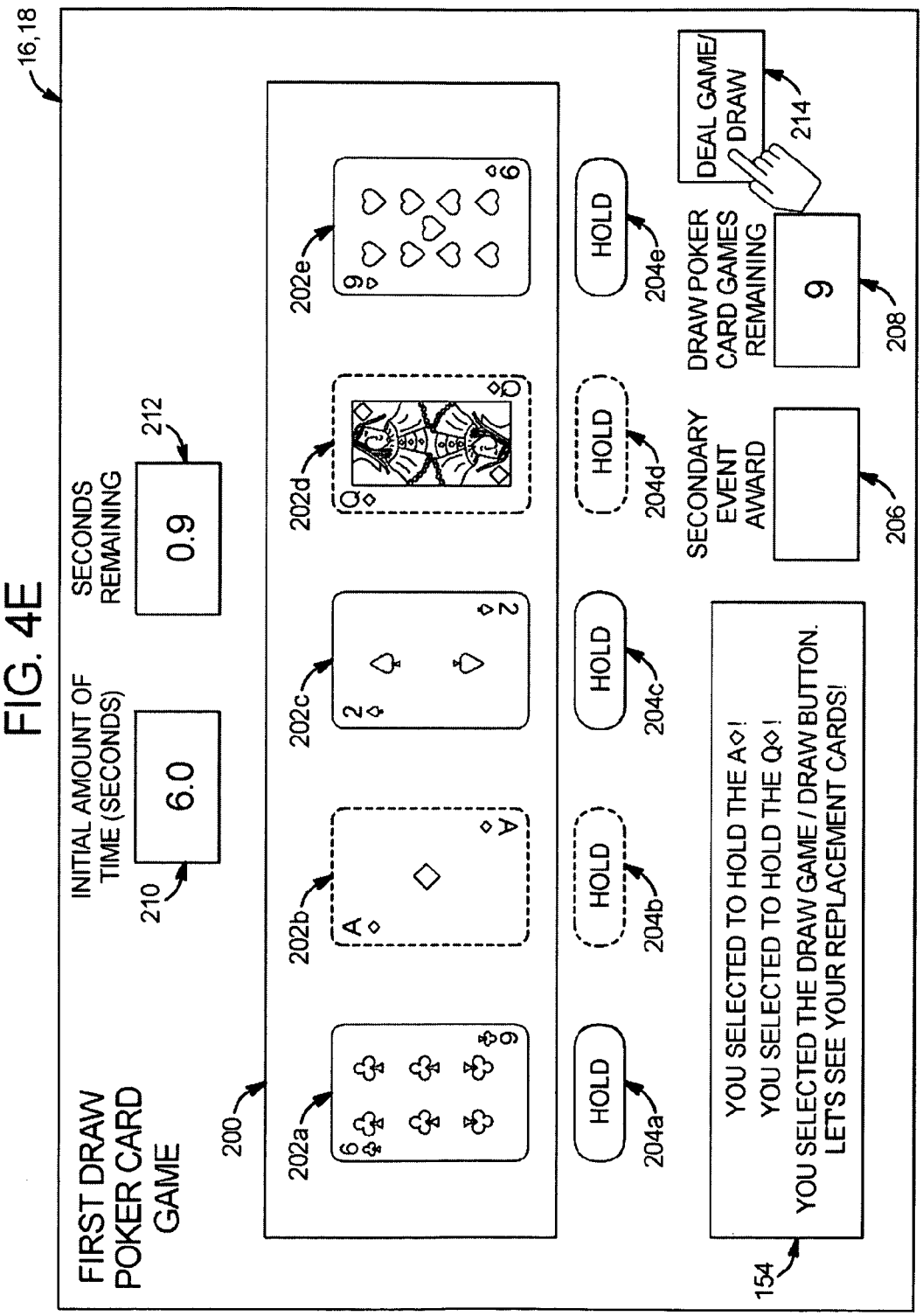

As illustrated in FIG. 4E, the player selects the deal game/draw button 214 with 0.9 seconds indicated by the time remaining meter 212. It should be appreciated that if the player did not select the draw button, the time remaining would expire and the game would proceed in the same manner as if the player selected the deal game/draw button before the time expired. An appropriate message such as "YOU SELECTED TO HOLD THE A♦! YOU SELECTED TO HOLD THE Q♦! YOU SELECTED THE DRAW GAME/DRAW BUTTON, LET'S SEE YOUR REPLACEMENT CARDS!" is provided to the player visually, such as in the message display 154, or through suitable audio or audiovisual displays.

As illustrated in FIG. 4F, the gaming system displays the final player hand 201 of the first draw poker card game by replacing each card not held with another card from the deck of cards. The player's replacement cards 202f, 202g and 202h are K♠ 10♣ J♦, respectively. Thus, the player's first final player hand 201 of draw poker is a straight (i.e., 10♣ J♦ Q♦ K♠ A♦).

The gaming system determines that the displayed final player hand 201 includes a predetermined winning combination. That is, the straight is a predetermined winning combination. The player is thus awarded one hundred credits for the straight and the secondary event ends. An appropriate message such as "CONGRATULATIONS! YOU WIN AN AWARD BASED ON YOUR OUTCOME OF A STRAIGHT! THE SECONDARY EVENT IS OVER" is provided to the player visually, such as in the message display 154, or through suitable audio or audiovisual displays.

In one alternative embodiment, after the player is awarded one hundred credits for the straight, the secondary event does not end because the gaming system determines that the predetermined winning card combination (i.e., the straight) is not above a certain level. The gaming system includes a pay table which associates each predetermined winning card combination with a level. In this alternative example embodiment, for the five card draw poker game, the following pay table illustrates each predetermined winning card combination associated with a level.

| Level | Name | Example Winning Card Combination |
|---|---|---|
| 9 | Royal Straight Flush | A♣ K♣ Q♣ J♣ 10♣ |
| 8 | Straight Flush | K♣ Q♣ J♣ 10♣ 9♣ |
| 7 | Four of a Kind | J♣ J♥ J♦ J♠ 3♣ |
| 6 | Full House | A♥ A♦ A♣ 6♦ 6♣ |
| 5 | Flush | A♣ J♣ 8♣ 6♣ 2♣ |
| 4 | Straight | 8♦ 7♣ 6♠ 5♣ 4♣ |
| 3 | Three of a Kind | Q♣ Q♥ Q♦ 6♦ 2♣ |
| 2 | Two Pair | 8♦ 8♥ 5♥ 5♣ 2♣ |
| 1 | Jacks or Better | J♦ J♠ 8♣ 7♣ 2♥ |

In this alternative example embodiment, the resulting winning card combination must be above a level of 5 (i.e., a flush) to prevent the subsequent draw poker card games from being provided to the player. Because the winning card combination, in this example, is associated with the level 4 (i.e., the straight) and less than the level 5, after the gaming system provides the player one hundred credits for the straight, the gaming system then determines whether the remaining number of draw poker card games to provide to the player is equal to a designated number. If, for example, the resulting winning card combination was associated with the level 5 (i.e. a flush), the gaming system would end the secondary event.

Switching examples, and referring now to FIGS. 5A to 5P, this example embodiment generally shows an example illustrating the gaming system providing, in the same manner as described above, a group including a determined number of sequentially displayed draw poker card games to the player. In this example embodiment, the secondary event ends if the gaming system determines that the remaining number of draw poker games to provide to the player is equal to a designated number. That is, the secondary event does not necessarily end after the gaming system provides an award based on any predetermined winning combinations. For each displayed subsequent draw poker card game, the designated period of time decreases in which the player may hold zero, one or more cards for that displayed subsequent draw poker card game.

FIG. 5A illustrates a first displayed initial player hand of draw poker card game from a group of provided draw poker card games which the player had previously been awarded. The gaming system previously determined to provide ten draw poker card games for the group. The draw poker card games remaining meter 208 indicates that the player has nine draw poker card games remaining.

In FIG. 5A, the display device 16 or 18 displays the first displayed initial player hand 200 of a draw poker game from the group of provided draw poker games. More specifically, the first displayed initial player hand 200 includes a plurality of cards 202i, 202j, 202k, 202l and 202m from a deck of cards. In this example, the gaming system displays the card values after the player selects the deal game/draw button.

The display device 16 or 18 displays the initial amount of time display 210, the time remaining meter 212, the secondary event award display 206 and the message display 154. For the first displayed initial player hand, the gaming system enables the player to hold zero, one or more cards within six seconds as indicated by the initial amount of time display 210. The gaming system determined that for each subsequently displayed draw poker card game, the designated period of time for the player to hold zero, one or more cards is decreased by a half of a second. An appropriate message such as "FOR THIS HAND, YOU ONLY HAVE 6.0 SECONDS TO HOLD ANY OF THE CARDS! SELECT THE DEAL GAME I DRAW BUTTON TO BEGIN!" is provided to the player visually, such as in the message display 154, or through suitable audio or audiovisual displays.

As illustrated in FIG. 5B, after the player selects the deal game/draw button, the gaming system displays the first displayed initial player hand including 5♣ 3♣ A♠ J♥ 8♠, and the designated period of time begins to decrease. In this example, the player holds the third card 202k which is an A♠ by selecting the hold card input 204c (as indicated by the dashed lines). The time remaining meter 212 indicates that the player has 3.2 seconds remaining for the player to hold additional cards. An appropriate message such as "YOU SELECTED TO HOLD THE A♠!" is provided to the player visually, such as in the message display 154, or through suitable audio or audiovisual displays. It should be appreciated that most draw poker gaming systems do not provide such a message to the player, and that in this example such a message is displayed for illustrative purposes.

Figure 5C:
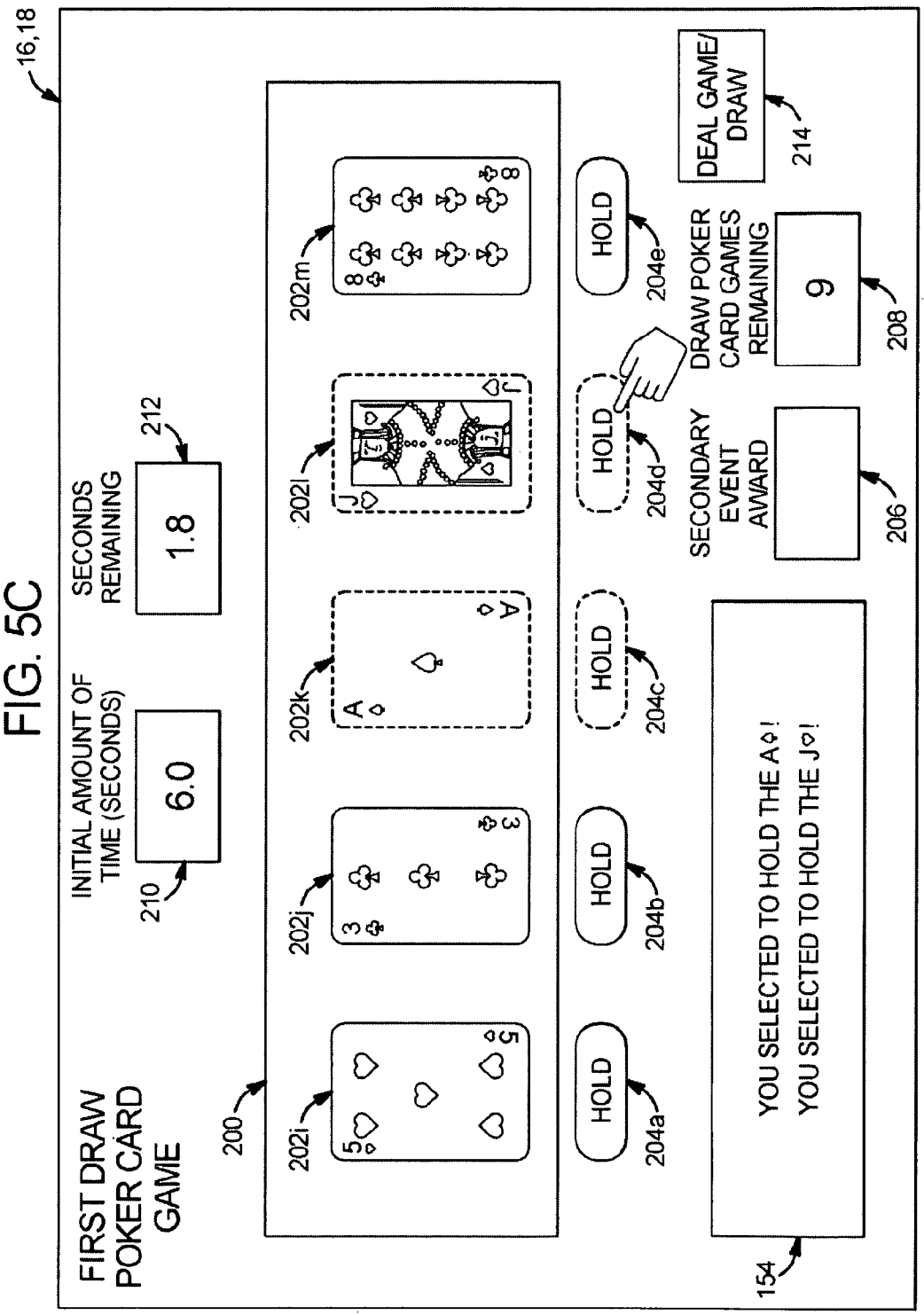

As illustrated in FIG. 5C, the player holds the fourth card 202l, which is an J♥, by selecting the hold card input 204d (as indicated by the dashed lines). The seconds remaining meter 212 indicates that the player has 1.8 seconds remaining for the player to hold additional cards. An appropriate message such as "YOU SELECTED TO HOLD THE A♠ YOU SELECTED TO HOLD THE J♥!" is provided to the player visually, such as in the message display 154, or through suitable audio or audiovisual displays. Again, it should be appreciated that most draw poker gaming systems do not provide such a message to the player, and that in this example such a message is displayed for illustrative purposes.

As illustrated in FIG. 5D, the time remaining meter 212 indicates zero seconds remaining and therefore the player is not enabled to hold any additional cards. An appropriate message such as "THE AMOUNT OF TIME REMAINING FOR YOU TO SELECT ADDITIONAL CARDS TO HOLD HAS EXPIRED! LET'S SEE YOUR REPLACEMENT CARDS!" is provided to the player visually, such as in the message display 154, or through suitable audio or audiovisual displays.

As illustrated in FIG. 5E, the gaming system displays the first final player hand 201 of the first draw poker card game by replacing each card not held in the first displayed initial player hand with another card from the deck of cards. The player's replacement cards 202n, 202o and 202p are 9♠ K♣ 6♦, respectively. Thus, the player's first final player hand 201 of draw poker is A♠ K♣ J♥ 9♠ 6♦.

The gaming system determines that the displayed final player hand 201 does not include a predetermined winning combination. That is, A♠ K♣ J♥ 9♠ 6♦ is not any of the predetermined winning card combinations.

The gaming system determines whether the remaining number of draw poker card games to provide to the player is equal to a designated number. In this example, the designated number is zero. In FIG. 5E, the draw poker card games remaining meter 208 indicates nine remaining draw poker card game remaining to provide to the player. That is, the gaming system enables the player to select the deal game/draw button 214 to display a subsequent draw poker card game because the remaining number of draw poker card games to provide the player is greater than zero.

Upon the selection of the deal game/draw button 214, the gaming system decreases the remaining number of draw poker card games to provide to the player. That is, the gaming system decreases the remaining number of draw poker card games from nine games to eight games. An appropriate message such as "YOUR OUTCOME OF A♠ K♣ J♥ 9♠ 6♦ IS NOT A WINNING COMBINATION. YOU HAVE 9 DRAW POKER CARD GAMES REMAINING. SELECT THE DEAL GAME/DRAW BUTTON FOR ANOTHER DRAW POKER CARD GAME" is provided to the player visually, such as in the message display 154, or through suitable audio or audiovisual displays.

As illustrated in FIG. 5F, upon receiving the selection of the deal game/draw button 214, the gaming system displays a subsequent draw poker card game from the group of provided card games having a decreased designated period of time for the player to hold cards in that displayed subsequent draw poker card game. More specifically, the display device 16 or 18 displays the initial player hand 200 of the second draw poker card game from the group of provided draw poker card games. The second displayed initial player hand 200 includes a plurality of cards 202q, 202r, 202s, 202t and 202u from the deck of cards. In FIG. 5F, the gaming system displays the card values after the player selects the deal game/draw button. The display device 16 or 18 displays an initial amount of time display 210 which indicates the initial designated period of time is 5.5 seconds for the player to hold any cards for the second displayed initial player hand. An appropriate message such as "FOR THIS HAND, YOU ONLY HAVE 5.5 SECONDS TO HOLD ANY OF THE CARDS! SELECT THE DEAL GAME/DRAW BUTTON TO BEGIN!" is provided to the player visually, such as in the message display 154, or through suitable audio or audiovisual displays.

As illustrated in FIG. 5G, after the player selects the deal game/draw button, the gaming system displays the first displayed initial player hand including 10♦ Q♠ 9♦ 9♠ 3♣ and the designated period of time begins to decrease. the player holds the third card 202s, which is an 9♦, by selecting the hold card input 204c (as indicated by the dashed lines). The time remaining meter 212 indicates that the player has 2.9 seconds remaining for the player to hold additional cards. An appropriate message such as "YOU SELECTED TO HOLD THE 9♦!" is provided to the player visually, such as in the message display 154, or through suitable audio or audiovisual displays.

As illustrated in FIG. 5H, the player holds the forth card 202t which is an 9♠, by selecting the hold card input 204d (as indicated by the dashed lines). The time remaining meter 212 indicates that the player has 0.7 seconds remaining for the player to hold additional cards. An appropriate message such as "YOU SELECTED TO HOLD THE 9♦! YOU SELECTED TO HOLD THE 9♣!" is provided to the player visually, such as in the message display 154, or through suitable audio or audiovisual displays.

As illustrated in FIG. 5I, the time remaining meter 212 indicates zero seconds remaining and thus the player is not enabled to hold any additional cards. An appropriate message such as "THE AMOUNT OF TIME REMAINING. FOR YOU TO SELECT ADDITIONAL CARDS TO HOLD HAS EXPIRED! LET'S SEE YOUR REPLACEMENT CARDS!" is provided to the player visually, such as in the message display 154, or through suitable audio or audiovisual displays.

Figure 5J:
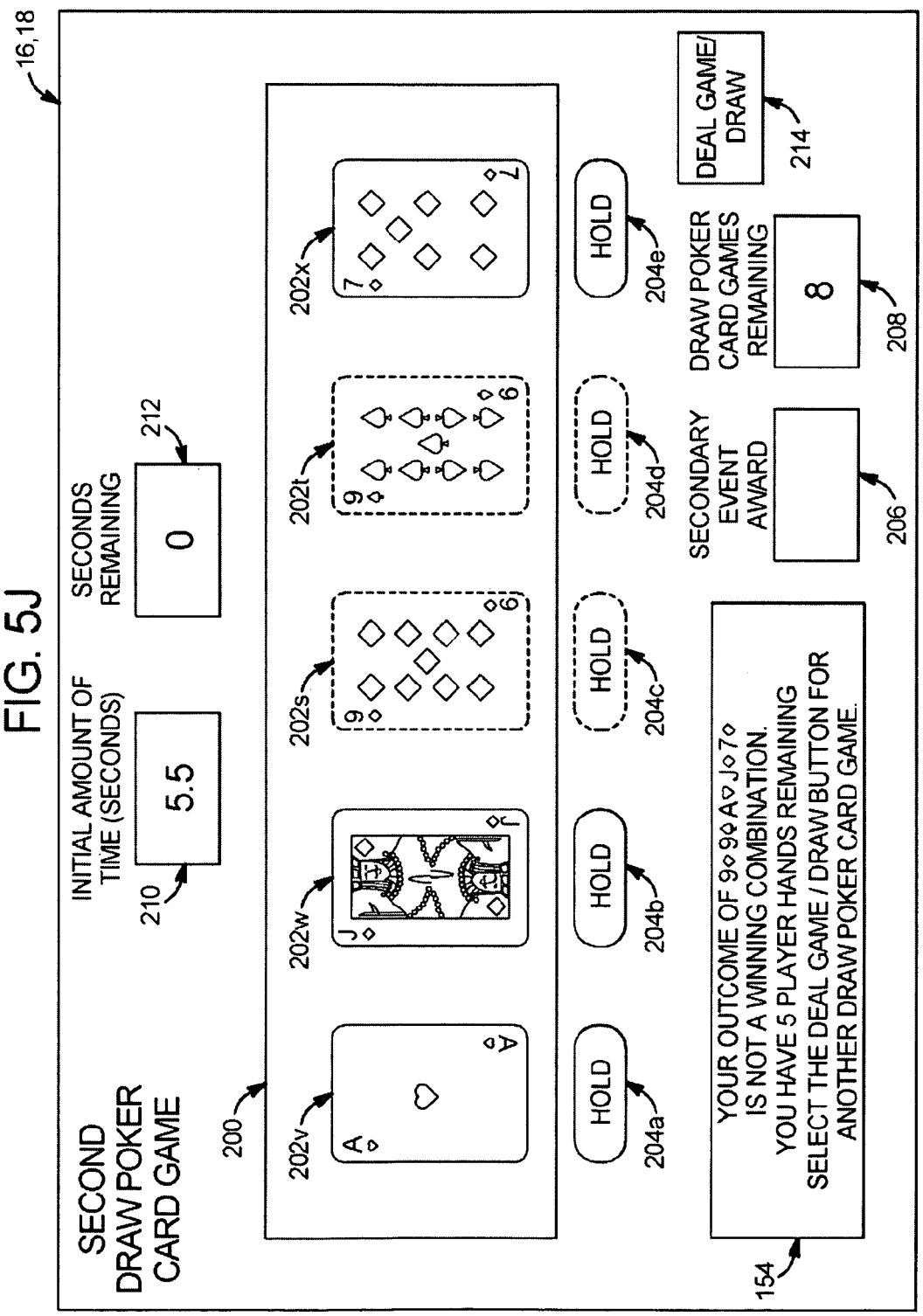

As illustrated in FIG. 5J, the gaming system displays the second final hand 201 of the second draw poker card game by replacing each card not held with another card from the deck of cards. The player's replacement cards 202v, 202w and 202x are A♥ J♦ 7♦, respectively. Thus, the player's displayed second final player hand 201 of the second draw poker card game is 9♣ 9♦ A♥ J♦ 7♦.

The gaming system determines that the displayed final player hand 201 does not include a predetermined winning combination. That is, 9♣ 9♦ A♥ J♦ 7♦ is not any of the predetermined winning card combinations.

The gaming system then determines whether the remaining number of draw poker card games to provide to the player is greater than zero. In FIG. 5J, the draw poker card games remaining meter 208 indicates that eight draw poker card games remain for the gaming system to provide to the player. The gaming system enables the player to select the deal game/draw button 214 to display a subsequent draw poker card game because the remaining number of draw poker card games to provide the player is greater than zero.

Upon the player selecting the deal game/draw button 214, the gaming system decreases the remaining number of draw poker card games to provide to the player. That is, the gaming system decreases the remaining number of draw poker card games from eight games to seven games. An appropriate message such as "YOUR OUTCOME OF 9♣ 9♦ A♥ J♦ 7♦ IS NOT A WINNING COMBINATION. YOU HAVE 8 PLAYER HANDS REMAINING. SELECT THE DEAL GAME/DRAW BUTTON FOR AN ADDITIONAL DRAW POKER CARD GAME" is provided to the player visually, such as in the message display 154, or through suitable audio or audiovisual displays.

Figure 5K:
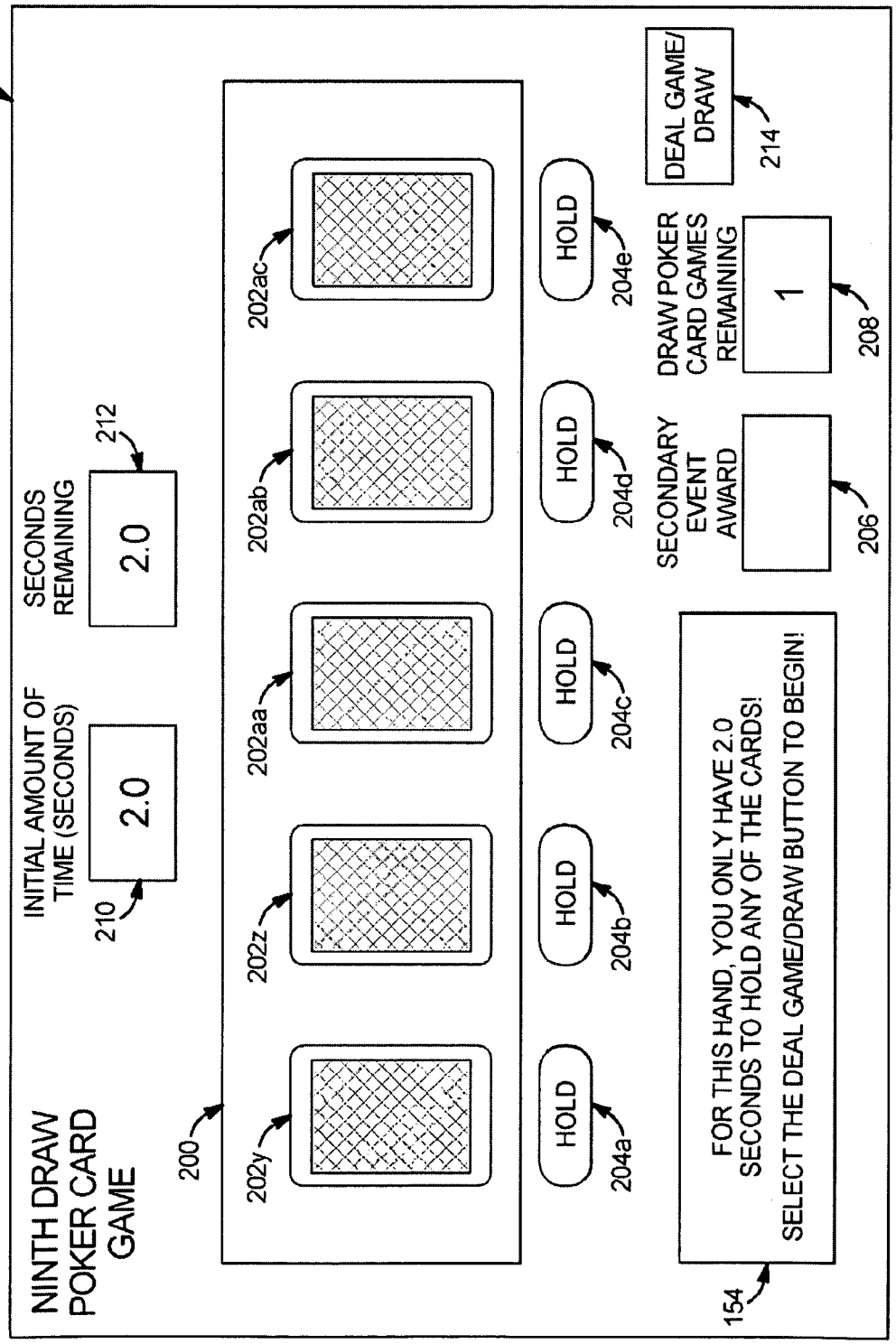

FIG. 5K illustrates the ninth displayed initial player hand of a draw poker card game from the group of provided card games in which the player had previously finished playing eight provided draw poker card games. The draw poker card games remaining meter 208 indicates that the player has one draw poker card game remaining.

As illustrated in FIG. 5K, the display device 16 or 18 displays the ninth initial player hand 200 of a draw poker card game. More specifically, the displayed ninth initial player hand 200 includes a plurality of cards 202y, 202z, 202aa, 202ab and 202ac from the deck of cards. In this example, the gaming system displays the card values after the player selects the deal game/draw button. An appropriate message such as "FOR THIS HAND, YOU ONLY HAVE 2.0 SECONDS TO HOLD ANY CARDS! SELECT THE DEAL GAME/DRAW BUTTON TO BEGIN!" is provided to the player visually, such as in the message display 154, or through suitable audio or audiovisual displays.

Figure 5L:
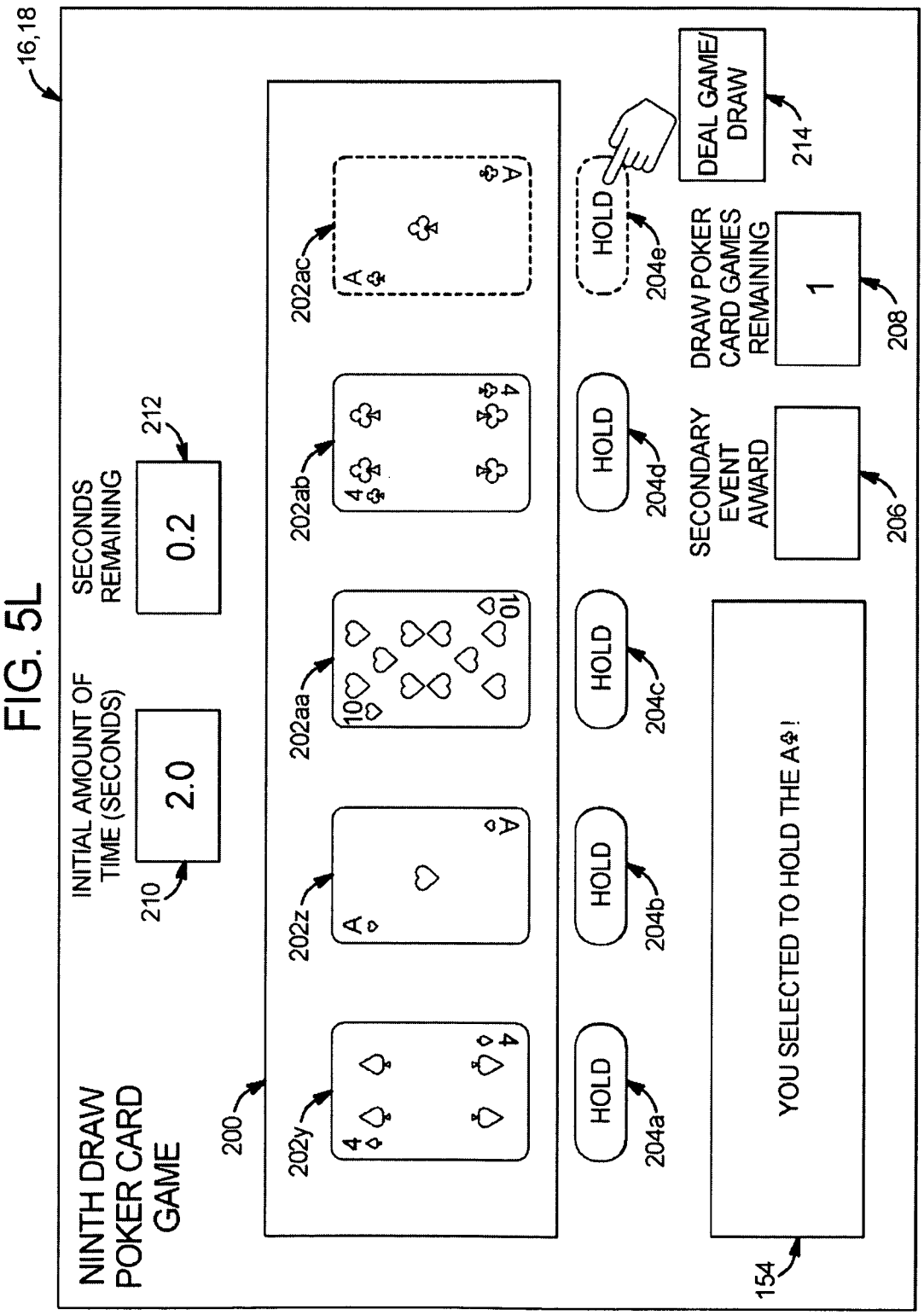

As illustrated in FIG. 5L, after the player selects the deal game/draw button, the gaming system displays the ninth displayed initial player hand including 4♣ A♥ 10♥ 4♠ A♣, and the designated period of time begins to decrease. In FIG. 5L, the player holds the fifth card 202ac, which is an A♣, by selecting the hold card input 204e (as indicated by the dashed lines). The time remaining meter 212 indicates that the player has 0.2 seconds remaining for the player to hold additional cards. An appropriate message such as "YOU SELECTED TO HOLD THE A♣!" is provided to the player visually, such as in the message display 154, or through suitable audio or audiovisual displays.

As illustrated in FIG. 5M, the time remaining meter 212 indicates zero seconds remain for the player to hold any additional cards. It should be appreciated that in FIG. 5M, because the decreased time period expired the player was unable to hold the A♥ which should have been held to maximize the value of the player's final hand. An appropriate message such as "THE AMOUNT OF TIME REMAINING FOR YOU TO SELECT ADDITIONAL CARDS TO HOLD HAS EXPIRED! LET'S SEE YOUR REPLACEMENT CARDS!" is provided to the player visually, such as in the message display 154, or through suitable audio or audiovisual displays.

As illustrated in FIG. 5N, the gaming system displays the ninth final player hand 201 of a draw poker card game by replacing each card not held with another card from the deck of cards. The player's replacement cards 202ad, 202ae, 202af and 202ag are A♠ 2♦ 2♣ A♦, respectively. Thus, the displayed ninth final player hand 201 of the draw poker card game is a full house (i.e., A♦ A♣ A♣ 2♦ 2♠).

The gaming system determines that the displayed ninth player hand includes a predetermined winning combination. That is, the full house is a predetermined winning combination. The player is thus awarded two hundred credits for the full house as shown in the secondary event award display 206.

The gaming system then determines whether the remaining number of draw poker card games to provide to the player is greater than zero. In FIG. 5N, the draw poker card games remaining meter 208 indicates one draw poker card game remains for the gaming system to display to the player. That is, the gaming system enables the player to select the deal game/draw button 214 to display a subsequent draw poker card game because the remaining number of draw poker card games to provide to the player is greater than zero.

Upon the player selecting the deal game/draw button 214, the gaming system decreases the remaining number of draw poker card games to provide to the player. That is, the gaming system decreases the remaining number of draw poker card games from one game to zero games. An appropriate message such as "CONGRATULATIONS! YOU WIN AN AWARD BASED ON YOUR OUTCOME OF A FULL HOUSE! SELECT THE DEAL GAME/DRAW BUTTON FOR YOUR LAST DRAW POKER CARD GAME" is provided to the player visually, such as in the message display 154, or through suitable audio or audiovisual displays.

As illustrated in FIG. 5O, upon receiving the player selection of the deal game/draw button 214, the gaming system displays the tenth and last initial player hand of draw poker. More specifically, the display device 16 or 18 displays the initial player hand 200 which includes a plurality of cards 202ah, 202ai, 202aj, 202ak and 202al from the deck of cards. In FIG. 5O, the gaming system displays the card values after the player selects the deal game I draw button. An appropriate message such as "FOR THIS HAND, YOU ONLY HAVE 1.5 SECONDS TO HOLD ANY CARDS! SELECT THE DEAL GAME/DRAW BUTTON TO BEGIN!" is provided to the player visually, such as in the message display 154, or through suitable audio or audiovisual displays.

FIG. 5P illustrates the displayed tenth final player hand 201 of draw poker in which the player had previously held cards 202ah and 202ai (i.e., K♥ and Q♥) and wherein the time remaining for the player to hold any additional cards expired as indicated by the time remaining meter 212.

As illustrated in FIG. 5P, the player's replacement cards 202am, 202an and 202ao are 4♥ 9♥ 2♥, respectively. Thus, the displayed final player hand 201 of draw poker is a flush (i.e., K♥ Q♥ 9♥ 4♥ 2♥).

The gaming system determines that the displayed tenth player hand includes a predetermined winning combination. That is, the flush is a predetermined winning combination. The player is thus awarded one hundred fifty credits for the flush as shown in the message display.

The gaming system then determines whether the remaining number of draw poker card games to provide to the player is greater than zero. In FIG. 5P, the draw poker card games remaining meter 208 indicates zero remaining draw poker card game remaining. The gaming system ends the secondary event because the remaining number of draw poker card games to provide the player is not greater than zero. An appropriate message such as "CONGRATULATIONS! YOU WIN AN AWARD OF 150 CREDITS BASED ON YOUR OUTCOME OF A FLUSH! THE SECONDARY EVENT IS OVER BECAUSE YOU DO NOT HAVE ANY REMAINING PLAYER HANDS REMAINING" is provided to the player visually, such as in the message display 154, or through suitable audio or audiovisual displays.

In different embodiments, the secondary events which are provided if the secondary event triggering event occurs may incorporate any suitable type of player input type game such as Three Card Draw, Seven Card Draw, Multi-Hand Poker, Pick'em Poker, Pai Gow Poker, LET IT RIDE™, Blackjack, any puzzle-type game, any suitable selection game where a player must make a decision, and any suitable offer and acceptance game. LET IT RIDE is a trademark of Shuffle Master, Inc.

It should be appreciated that the secondary event triggering event can be triggered in any suitable manner. In various alternative embodiments, the secondary event triggering event may be based on but not limited to at least one of: (i) an amount of time played on the gaming system: (ii) a random time of the day; (iii) an amount of money wagered on the gaming system; (iv) an amount of money lost at the gaming system; (v) an amount of money won at the gaming system; (vi) an amount of money wagered at games in a gaming system; (vii) an amount of money lost at the gaming systems in a gaming system; (viii) an amount of money won at the gaming systems in a gaming system; (ix) an event or outcome occurring in the primary game of one of the gaming systems; (x) an event occurring due to a shared random outcome generation; (xi) meeting one or more thresholds, such as a number of plays or a wager pool exceeding a designated amount; (xii) a random determination based on an amount wagered; (xiii) an occurrence of a predetermined event; (xiv) one or more side wagers placed; and (xv) any combination of these.

It should be appreciated that the number of draw poker card games to provide to the player can be determined in any suitable manner. In different embodiments, the determination of the number of draw poker card games to provide to the player is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system determines and displays a designated amount of time for a player to play a plurality of draw poker card games within the designated amount of time. In this embodiment, the designated amount of time decreases while the player plays as many draw poker card games as the player can within the designated amount of time. Thus, in this embodiment, the number of draw poker card games to provide to the player is determined by the speed in which the player completes each draw poker card game. The gaming system does not provide any draw poker card games to the player after the designated amount of time expires. In this embodiment because the player is encouraged to play as many draw poker cards games within the designated amount of time, it is expected that the player will play the draw poker card games at a faster rate than the player would play if the gaming system did not determine and display the designated amount of time.

In one embodiment; the remaining number of draw poker card games to provide to the player increases, decreases, or remains the same based a player's action or inaction in one or more of the provided draw poker card games. In one such embodiment, the remaining number of draw poker card games to provide to the player increases, decreases, or remains the same based on whether the player holds certain cards during the play of a displayed initial hand. In one example embodiment, the gaming system determines whether a player held cards in a displayed initial player hand that would maximize the potential value for that displayed initial player hand. In this example, the remaining number of draw poker card games increases, decreases, or remains the same based on whether the player hold cards for the displayed initial player hand that would maximize the potential value for the displayed initial player hand. In this example, if the player does not hold cards that would maximize the potential value for the displayed initial player hand, the gaming system does not provide any remaining draw poker card games to the player. In this example embodiment, if the player holds cards that would maximize the potential value for the displayed initial player hand, the gaming system increases the remaining draw poker card games to the player. Alternatively, in one example embodiment, if the player holds cards that would maximize the potential value for the displayed initial player hand, the gaming system causes the remaining draw poker card games to remain the same for the subsequently provided draw poker card game.

In an alternative embodiment, if the player does not hold cards that would maximize the potential value for at least two consecutive plays of initial player hands of draw poker card games, the gaming system does not provide any remaining draw poker card games to the player.

In one embodiment, the plurality of cards displayed for each draw poker card game are displayed from a single virtual conventional deck of fifty-cards. In another embodiment, two or more decks of cards are used. In another embodiment, one or more of the decks contain a different number of cards other than the standard fifty-two cards. In one embodiment, one or more Jokers are available in the deck, such Jokers may be assigned usage rules including, but not limited to, being treated as a general Wild card which substitutes for any other card.

In one embodiment, the determination of the designated period of time for a player to hold zero, one or more cards is based on an outcome of a previously displayed final player hand of a draw poker card game. In one example embodiment, wherein the gaming system determined that a previously displayed final player hand included a winning card combination, the gaming system increases the designated period of time for the subsequently displayed initial player hand of draw poker. In one example embodiment, wherein the gaming system determined that a previously displayed final player hand included a winning card combination, the gaming system causes the designated period of time for the subsequently displayed initial player hand of draw poker to remain the same.

More specifically, in one example embodiment, wherein the gaming system provides a first initial player hand of a draw poker card game wherein the designated period of time for the player to hold zero, one or more cards for that first displayed initial player hand is five seconds and the gaming system determines that the first displayed final player hand includes a winning card combination of a pair of Jacks, the gaming system increases the designated period of time for the subsequently displayed initial player hand because the first final player hand included a winning card combination (the pair of Jacks). In alternative example embodiment, the gaming system causes the designated period of time for the subsequently displayed initial player hand to remain the same (i.e., five seconds) because the first final player hand included a winning card combination.

In one embodiment, wherein the gaming system determines whether a first final player hand of draw poker includes a predetermined winning card combination above a certain level, the determination of the designated period of time to hold zero, one or more cards for the subsequently displayed initial player hand of draw poker is based on the determination of whether the first final player hand included a predetermined winning card combination above the certain level. In one embodiment, the gaming system increases the designated period of time to hold zero, one or more cards for a subsequently displayed initial player hand of draw poker when a previously displayed final hand includes a full house or better. In one example embodiment, wherein the gaming system determines that the a first displayed final player hand includes a winning card combination of a four of a kind, the gaming system increases the designated period of time to hold zero, one or more cards for the subsequently displayed initial player hand because this first final player hand included a winning card combination of a full house or better. Moreover, in another example embodiment, wherein the gaming system determines that a first displayed final player hand includes a winning card combination of a pair of Jacks, the gaming system decreases the designated period of time to hold zero, one or more cards for the subsequently displayed initial player hand because this first final player hand did not include a winning card combination of a full house or better.

In one embodiment, the gaming system causes each of the cards of an initial player hand to move at a predefined speed, velocity, or rate through a stationary holding zone displayed by the display device. The distance of the holding zone along the direction of travel divided by the speed yields the time that the player has to hold cards when it is within the holding zone. Thus, in this embodiment, the designated period of time for a player to hold zero, one or more cards is based on the amount of time in which these cards are displayed in the holding zone. In one example embodiment, each of the five displayed cards of an initial player hand move in a downward direction from the top of the display screen to the bottom of the display screen through the stationary holding zone. In this example embodiment, the player must hold zero, one or more cards before the displayed cards reach the bottom of the display screen. In one example embodiment, the gaming system automatically holds each card not held in a displayed initial player hand that reaches the bottom of the screen. In one embodiment, each of the cards in a subsequently displayed initial player hand fall faster than each of the cards in a previously displayed initial player hand and thus the player has less time to make any decisions to hold zero, one or more of the cards for each subsequently displayed initial player hand of draw poker.

In one embodiment, the determination of the designated period of time for which a player may hold zero, one or more cards is based on the amount of time the player used to hold cards in a previously displayed draw poker card game. In one such embodiment, the gaming adds any unused time in a displayed initial player hand to a subsequently provided initial player hand of draw poker. More specifically, in one example embodiment, the gaming system determines to provide a player with ten draw poker card games. The gaming system initially determines that the designated time period for the player to hold zero, one or more cards in the first provided draw poker card game is six seconds, and the designated time period for the player to hold zero, one or more cards in the second provided draw poker card game is five seconds. In this example embodiment, the player completes the first provided draw poker card game within three seconds. That is, the player did not use three seconds of the initially determined six seconds in the first provided draw poker card game. The gaming system adjusts the initially determined designated period of time for the player to hold zero, one or more cards in the second draw poker card game by adding the unused time from the previously displayed draw poker card game (i.e., three seconds) to the initially determined designated period time period (i.e., five seconds). Accordingly, the designated time period for the player to hold zero, one or more cards for the second provided card game is now eight seconds.

In another embodiment, the gaming system accumulates any unused time in each draw poker card game for later use in other draw poker card games. In one such embodiment, for a displayed initial player hand the player is enabled to apply all or a portion of the accumulated time to increase the designated period of time to hold zero, one or more cards for that initial player hand. More specifically, in one example embodiment wherein the gaming system accumulates a total of 2.5 seconds of unused time after the player completes eight provided draw poker card games, for the subsequently provided draw poker card game the gaming system enables the player to increase the designated period of time to hold zero, one or more cards by at most 2.5 seconds.

It should be appreciated that the designated period of time for a player to hold zero, one or more cards can be determined in any suitable manner. In different embodiments, the determination of the designated period of time for which a player may hold zero, one or more cards is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria. The following chart illustrates a plurality of examples of different determinations of designated periods of time for which a player may hold zero, one or more cards.

| Hand | Designated Period of Time | Designated Period of Time | Designated Period of Time | Designated Period of Time |
|---|---|---|---|---|
| 1 | 5.0 | 5.0 | 4.5 | 64.0 |
| 2 | 4.5 | 5.0 | 5.5 | 32.0 |
| 3 | 4.0 | 4.0 | 6.0 | 16.0 |
| 4 | 3.5 | 4.0 | 4.0 | 8.0 |
| 5 | 3.0 | 3.0 | 4.0 | 4.0 |
| 6 | 2.5 | 3.0 | 2.0 | 2.0 |
| 7 | 2.0 | 2.0 | 7.0 | 1.0 |

It should be appreciated that whether the gaming system decreases or increases the designated period of time for any of the draw poker card games can be determined in any suitable manner. In one embodiment, the gaming system determines to increase, decrease, or cause the designated period of time to hold zero, one or more cards to remain the same in each provided draw poker card game. In another embodiment, the gaming system determines to increase, decrease, or cause the designated period of time to hold zero, one or more cards to remain the same in every other subsequently provided draw poker card game. In different embodiments, the determination of whether to decrease the designated period of time which the player may hold cards is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system enables the player to change the designated period of time which the player may hold zero, one or more cards. In one example embodiment, the gaming system enables the player to purchase extra time to hold zero, one or more cards in at least one initial player hand. In one embodiment, wherein the gaming system determines and displays an amount of time for a player to play as many draw poker cards within the amount of time, the gaming system enables the player to purchase more time to play as many draw poker card games. In one embodiment, wherein the player purchases extra time to hold cards, the gaming system doubles the amount of time for the player to hold cards for each of a plurality of initial player hands.

In one embodiment, the gaming system associates a draw poker game volatility with a designated period of time to hold zero, one or more cards in an initial player hand of draw poker. In this embodiment, the gaming system enables a player to choose the draw poker game volatility and thus the designated period of time to hold zero, one or more cards for an initial player hand of draw poker. In one embodiment, the gaming system enables the player to choose a draw poker game volatility which includes a paytable associated with an average expected payback percentage greater than one hundred percent. In this embodiment, the gaming system preferably associates such a game volatility with a relatively low designated period of time for a player to hold zero, one or more cards because it should be appreciated that a player is less likely to play a game with a relatively low designated period of time to hold zero, one or more cards with an optimal strategy.

In one embodiment, the gaming system enables the player to choose a designated period of time associated with the volatility of a draw poker card game. In one example embodiment, for a certain provided draw poker card game the player selects a low designated period of time which because the low designated period of time is associated with a paytable associated with an average expected payback percentage of over one hundred percent.

In one embodiment, the plurality of cards displayed for an initial player hand are automatically held by a suitable auto-hold computer program if the player does not hold any cards in that displayed initial player hand. In this embodiment, a card is automatically held for the displayed initial player hand if holding that card will maximize the potential value of the draw poker game outcome. In one example where the secondary event includes a Five Card Draw poker game where the player has already initially accumulated a pair of fives for a displayed initial player hand of the Five Card Draw poker game, the most valuable card to the player would be another five so as to form three-of-a-kind. Therefore, if the player's displayed initial player hand includes a pair of fives, a two, a ten and a nine, the gaming system would automatically hold the pair of fives if the player does not hold any cards for that displayed initial player hand.

In one embodiment, if the player does not hold any cards in a displayed initial player hand, the gaming system automatically replaces each of the cards in that displayed initial player hand.

In one embodiment, the gaming system determines and displays a designated amount of time in which the player can play a designated amount of draw poker card games within the designated amount of time. In this embodiment, the designated amount of time decreases as the player plays each of the designated amount of draw poker card games. In this embodiment, if the player completes each of the designated amount of draw poker card games with the designated amount of time, the gaming system provides an award based on the time remaining in the determined designated amount of time. Specifically, in one example embodiment wherein the player completes each of a designated amount of draw poker card games with five seconds remaining of unused time, the gaming system provides the player with award of one hundred credits based on the five seconds remaining.

In one embodiment, the gaming system provides award to the player based on an amount of unused time from a previously played draw poker card game. More specifically, in one example embodiment wherein a player completes a draw poker card game with five seconds remaining to hold zero, one or more cards, the gaming system provides the player with an award of five draw poker cards games because the player completed the draw poker card game with five seconds remaining.

In one embodiment, the gaming system associates each provided draw poker card game with a paytable which is associated with an average expected payback percentage. In one embodiment, the awards provided to the player for winning card combinations are based on the paytables associated with an average expected payback percentage. In one embodiment, the gaming system changes an average expected payback percentage associated with a paytable as a player progresses though a plurality of draw poker card games. More specifically, in one example embodiment, for a plurality of subsequently provided draw poker card games in which the designated period of time for a player to hold zero, one or more cards, the gaming system increases the average expected payback percentage for each subsequently displayed draw poker card game. That is, the average expected payback percentage increases as the time period to hold zero, one or more cards in each draw poker card game decreases. In one embodiment, for a draw poker card game the gaming system includes a paytable associated with an average expected payback percentage of over one hundred percent. In this embodiment, the gaming system preferably associates such a paytable with a draw poker card game having a relatively low designated period of time for a player to hold zero, one or more cards because it should be appreciated that a player is less likely to play the draw poker card game with a relatively low designated period of time to hold zero, one or more cards with an optimal strategy.

In one embodiment, each card in an initial player hand is associated with a designated amount of time. In this embodiment, if the player holds zero, one or more of the cards in the initial player hand within the designated period of time for the player to hold zero, one or more cards, the gaming system provides an award associated with the designated period of time associated with each card in the initial player hand. In one example embodiment, the gaming system provides the player with an initial player hand including an A♣ K♦ 7♠ 3♥ 2♣ wherein these cards are respectively associated with the following designated amounts of time (in seconds): 7, 2, 9, 8, and 5. In this example embodiment, the gaming system randomly determined the designated amounts of time for each of the cards. In this example embodiment, for this initial player hand the gaming system determines that the designated period of time for the player to hold zero, one or more cards is six seconds. The player, in this example embodiment, holds the A♣ and the K♦ and then selects the deal game/draw button with two seconds remaining to hold zero, one or more cards. In this example embodiment, the gaming system provides the player with an award of thirty one seconds (i.e., the sum of each of the designated amounts of time associated with cards displayed) because the player completed the play of the game within the designated period of time. Alternatively, in one embodiment, the gaming system provides the player with an award of nine seconds (i.e., the sum of each of the designated amounts of time associated with held cards for this card game) because the player completed the play of the game within the designated period of time. In this example embodiment, the gaming system enables the player to apply all or a portion of this time provided for one or more subsequent draw poker games. In one alternative embodiment, the gaming system determines which cards, if any, in an initial player hand are associated with a designated amount of time. It should be appreciated that in this alternative example, the gaming system encourages the player to select cards in which the gaming system associated a designated amount of time.

It should be appreciated that the awards associated with the winning combinations of the secondary events can be any suitable award. In different embodiments, the awards associated with the winning combinations of the secondary events include, but are not limited to: a quantity of free activations of one or more games; an applicable multiplier for at least one, a plurality or each of the free spins; a credit amount (based on a triggering event and/or a wager placed); a quantity of picks in the game; a quantity of selections in the game; a quantity of retrigger symbols in the game; a quantity of terminators or termination symbols in the game; a quantity of anti-terminators in the game; a quantity of locking reels in the game; a quantity of locking symbol positions in the game; a quantity of expanding symbols in the game; a quantity of rounds or levels in the game; a quantity of award opportunities in the game; a quantity of progressive awards in the game; a range of available awards in the game; a quantity of active reels in the game; a quantity of offers in the game; a paytable which will be utilized in the game; a quantity of hands of playing cards in the game; any combination thereof; and any other suitable award.

In one embodiment, the gaming system includes a timer display device which displays the period of time remaining for the player to hold any cards in the displayed initial player hand. In one such embodiment, the timer display includes a flashing device which flashes in a manner to attract the attention of players and by-standers nearby. In another such embodiment, the timer display device is mounted above the player's individual gaming system.

In one embodiment, the sound generating device controlled by one or more sounds cards causes the processor to generate sound associated with each of the different designated period of times for the player to hold cards. In one example embodiment, each designated period of time for an initial player hand is associated with a heart beat sound. In this embodiment, the generated heart beat sound beats at an increased rate when the designated period of time is decreased.

It should be appreciated that each of the above described embodiments of the present disclose could be employed in a tournament variation of poker. In one embodiment, wherein a plurality of gaming devices are provided for the tournament, each gaming device is capable of awarding the top prize in the tournament. It should be appreciated that the tournament can have any number of players and can award any number of prizes. It should also be appreciated that the tournament can be held once, a plurality of times, or periodically.

In one embodiment, the gaming system includes a common display or leader board which indicates a plurality of scores associated with a plurality of gaming devices for a tournament. In one embodiment, the common display ranks the plurality of scores for each of a plurality of gaming devices from highest to lowest. In one embodiment, one or more of the scores indicated by the common display are associated with the highest amount of credits provided to one or more of the players for certain winning card combinations of draw poker card games.

In one embodiment, one or more of the scores indicated by the common display are based on a composite score of a plurality of factors. In one embodiment, the plurality of factors are based on at least two of: whether the player held cards that would maximize the potential value for one or more provided draw poker card games; a total amount of credits provided to the player for one or more plays of the draw poker card games; and the amount of time that the player used to play one or more draw poker card games.

In one embodiment, the gaming system associates an average expected payback percentage for each of a plurality of provided draw poker card games. In one embodiment, wherein the gaming system does not provide a player with any remaining card games based on a player's action or inaction in one or more card games, the gaming system determines a player's tournament score based, at least in part, on the average expected payback percentage associated with any remaining draw poker card games not provided to the player. More specifically, in one example embodiment, the gaming system provides a player with a group of ten sequentially displayed draw poker card games. Each of these draw poker card games is associated with an average expected payback percentage. In this example embodiment, in the sixth displayed draw poker card game the player does not hold any cards and thus, in this example, the gaming system does not provide the remaining draw poker card games (i.e., the last four draw poker card games) because the player did not hold any cards for sixth displayed draw poker card game. In this example embodiment, the gaming system determines the player's tournament score based on the average expected payback percentage associated with each of the remaining draw poker card games not provided to the player (i.e., the seventh through the tenth card games). It should be appreciated that, in this example embodiment, the player is encouraged to hold cards for each provided draw poker card game to increase the tournament score. That is, the player may receive a lower score when the player does not hold cards and allows the gaming system to automatically hold cards for the player.

In one embodiment, the gaming system determines an optimal strategy value for each provided initial player hand of draw poker. In this embodiment, the gaming system determines a tournament score for a player based on whether the player held cards in an initial player hand that would maximize the optimal strategy for that initial player hand. More specifically, in one example embodiment, wherein the gaming system provides a player with an initial player hand including A♣ A♥ A♠ 7♣ 8♦, the player must hold the A♠ A♥ A♣ to obtain the optimal strategy value for this initial player hand. In this example embodiment, if the player holds the A♠ A♥ A♣, the gaming system determines a relatively high tournament score for the player based on this selection because such a selection would maximize the optimal strategy value for that initial player hand. In this example embodiment, if the player does not select the A♣ A♥ A♠ cards in the initial player hand, the gaming system determines a tournament score which is lower than a tournament score based on the player selecting he A♣ A♥ A♠. In another example embodiment, the gaming system provides a player with a group of ten draw poker card games wherein the first displayed initial player hand of the first draw poker card game includes J♣ J♥ J♠ 7♣ 8♦. In this example, the player should hold the J♣ J♠ to obtain the maximum optimal strategy value for this provided draw poker card game. In this example, the player does not hold any of the displayed cards within the designated time period for the displayed initial player hand and thus the gaming system displays the player's first final player hand by replacing each of the cards not held. In this example, the player's replacement cards are K♠ K♦ K♥ Q♠ Q♦ (i.e., a full house). In this example embodiment, although the player receives an award associated with the full house, the player's tournament score is negatively effected because the player did not hold the A♣ A♥ A♠ from the first displayed initial player hand.

It should be appreciated that each of the above described embodiments of the present disclose can be employed in a multiplayer variation of poker. In one embodiment, a plurality of players play the same draw poker card games concurrently. In one embodiment, a plurality of players play a plurality of different draw poker card games. In one embodiment, the gaming system determines the fastest player based on the amount of time each of the players complete a plurality of draw poker card games. In this embodiment, the gaming system provides an award to the determined fastest player. In one embodiment, the award includes causing the designated period of time to hold zero, one or more cards in one or more subsequently provided draw poker card games to remain the same for the fastest player, while all the other players must play the next displayed draw poker card game with less time to hold zero, one or more cards.

In one embodiment, the gaming device tracks unused time for each of the players over the course of playing a plurality of draw poker card games. In this embodiment, the accumulated unused time includes any time unused for holding zero, one or more cards in an initial player hand. After each of the players finish playing all of their respective provided draw poker card games, the gaming device provides the player who has accumulated the most unused time with an award (i.e., credits or a multiplier) based on amount of accumulated unused time.

In one embodiment, the gaming system enables a plurality of players to play as many hands as possible within a predetermined amount of time. More specifically, in one example embodiment, each of the plurality of players is enabled to play as many draw poker card games within thirty seconds. In this example embodiment, the gaming system determines which player played the most number of draw poker card games within the predetermined amount of time. In this example, the gaming system provides an award to the player based the most number of draw poker card games played within the thirty seconds.

In one embodiment, the gaming system advances a plurality of players to a bonus round upon a suitable triggering event. In this embodiment, when the gaming system advances the plurality of players to the bonus round, the gaming system determines a designated amount of free draw poker card games to provide to one or more of the plurality of players. In one embodiment, the gaming system determines the designated amount of free draw poker card games based on a multiple of the quantity of players which advance to the bonus round. In another embodiment, the gaming system determines the designated amount of free draw poker card games to provide each player advanced to the bonus round based on predetermined amount such as two free games for each player.

In one embodiment, wherein the gaming system advances a plurality of players to a bonus round, the gaming system includes a communal bonus total. In one embodiment, the gaming system accumulates any money won for each draw poker card game played in the bonus round for the communal bonus total. That is, in this embodiment, the gaming system accumulates all of the money won by each of the players for the communal bonus total for the bonus round draw poker card games. In this embodiment, after a first player has played their draw poker game, a second player is immediately prompted to play their hand having a designated period of time that is less than the amount of time for the first player to play their hand. After the second player has played their hand, a third player is immediately prompted to play their draw poker card game having a designated period of time that is less than the amount of time for the second player to hold their hand. This process continues for each bonus round draw poker card game provided wherein each subsequently displayed draw poker card game has less amount of time to make an action. In this example embodiment, after each of the plurality of players play their respective draw poker card games, the gaming system provides each of the plurality of players that have advanced to the bonus round with the same bonus total won from all of the provided draw poker card games in the communal bonus total. In an alternative embodiment, the gaming system provides an award to each of the players based on a portion of the bonus total won from all draw poker card games in the bonus round.

In one embodiment, for the communal bonus total the gaming system accumulates the highest amount won for a draw poker card game by one of the plurality of players in the bonus round. More specifically, in one example embodiment, if in a first displayed final player hand a first player had the highest hand which is associated with one hundred credits compared to each of the other player's final hands, then the gaming system only accumulates the one hundred credits for the communal bonus total. In this example embodiment, when the secondary event ends, each player wins the same total amount (i.e., the one hundred credits).

In one embodiment, wherein the gaming system advances a plurality of players to a bonus round, the gaming device determines an order of play among the plurality of players who advance to the bonus game. In different embodiments, the order is randomly determined, based on player bet size, based on player tracking status, or any other suitable method.

Thus, it should be appreciated that in one embodiment, the gaming system causes at least one processor to operate with at least one display device and at least one input device to display a first multistage game in which a player must take a first action by making at least one input using the at least one input device in a first designated period of time, the first designated period of time being displayed. The gaming system also displays a subsequent second multistage game in which the player must take a second action by making at least one input using the at least one input device in a second designated period of time, wherein the second designated period of time is less than the first designated period of time, the second designated period of time being displayed. The gaming system determines whether any of the provided multistage games are associated with any awards and provides any awards associated with each provided multistage game.

It should be appreciated that in one embodiment, the gaming system cause at least one processor to operate with at least one display device and at least one input device to provide a group of sequentially displayed draw poker card games. Each draw poker card game includes an initial player hand and a final player hand. In this embodiment, a player has less time in each subsequently displayed initial player hand to hold cards for that displayed initial player hand. The gaming system determines whether any of the displayed final player hands include any a of a plurality of winning card combinations and provides any award associated with each determined winning card combination for the displayed final player hand.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
   at least one display device;
   at least one input device;
   at least one processor; and
   at least one memory device which stores a plurality of instructions, which when executed by the at least one processor, cause the at least one processor to operate with the at least one display device and the at least one input device to:
   (a) provide a group of sequentially displayed draw poker card games, each draw poker card game including an initial player hand and a final player hand;
   (b) display, from a deck of cards, an initial player hand of one of the draw poker card games from the group of provided draw poker card games;
   (c) enable the player to hold zero, one or more of the cards in the displayed initial player hand within a designated period of time;
   (d) display the final hand of the displayed draw poker card game by replacing each card for the displayed initial player hand of the displayed draw poker card game which is not held with another card from the deck of cards;
   (e) if the displayed final player hand includes a designated predetermined winning card combination, provide the player any awards based on that predetermined winning card combination and do not display any remaining draw poker card games from the group of sequentially displayed draw poker card games; and
   (f) if the displayed final player hand does not include a winning card combination, do not provide the player any awards, and for each subsequently displayed draw poker card game, repeat (b) to (e) with a decreased amount of time for the player to hold the cards for the displayed initial player hand for that subsequently displayed draw poker card game.

2. The gaming system of claim 1, wherein when executed by the at least one processor, the plurality of instructions cause the at least one processor to operate with the at least one display device to display the initial player hand and the final player hand of a displayed draw poker card game from a shuffled fifty-two card deck of cards.

3. The gaming system of claim 1, wherein when executed by the at least one processor, the plurality of instructions cause the at least one processor to determine a number of draw poker card games for the group to provide to the player.

4. The gaming system of claim 1, wherein when executed by the at least one processor, the plurality of instructions cause the at least one processor to operate with the at least one input device to enable the player to change the amount of time for the player to hold the cards for at least one draw poker card game.

5. The gaming system of claim 1, wherein when executed by the at least one processor, the plurality of instructions cause the at least one processor to operate with the at least one display device to display the designated period of time for the player to hold the cards for the displayed initial player hand.

6. The gaming system of claim 1, wherein when executed by the at least one processor, the plurality of instructions cause the at least one processor to automatically replace all the cards in the displayed initial player hand if the player does not hold any cards within the designated period of time for that displayed initial player hand.

7. The gaming system of claim 1, wherein a plurality of the awards are each based on a paytable.

8. The gaming system of claim 7, wherein when executed by the at least one processor, the plurality of instructions cause the at least one processor to modify the paytable based on a quantity of draw poker card games played during a designated amount of time.

9. A gaming system comprising:
   at least one display device;
   at least one input device;
   at least one processor; and
   at least one memory device which stores a plurality of instructions, which when executed by the at least one processor, cause the at least one processor to operate with the at least one display device and the at least one input device to:
   (a) enable a player to initiate a play of a primary game upon a wager;
   (b) display the play of the primary game and determine an outcome for the play of the primary game;
   (c) provide any awards associated with the primary game outcome;
   (d) determine whether a secondary event triggering event occurs; and (e) if the secondary event triggering event occurs:
  (i) determine a number of subsequently displayed draw poker games to provide to the player, each of the draw poker games including an initial player hand and a final player hand;
  (ii) display, from a deck of cards, an initial player hand from one of the provided draw poker games, the initial player hand including a plurality of cards;
  (iii) after the initial player hand is displayed, enable the player to hold at least one of the plurality of cards in the displayed initial player hand within a designated period of time for that displayed initial player hand;
  (iv) after the designated period of time period expires, display the final player hand from the draw poker card game by replacing each card not held in the initial player hand of the draw poker card game with another card from the deck of cards;
  (v) if the player hand includes one of a plurality of different predetermined winning combinations, provide the player any awards based on that predetermined winning combination;
  (vi) determine whether a remaining number of draw poker card games to provide to the player is equal to a designated number;
  (vi) if the remaining number of draw poker card games to provide to the player is equal to the designated number, do not display any subsequent draw poker card games;
  (vii) if the remaining number of draw poker card games to provide to the player does not equal the designated number:
    (A) decrease the remaining number of draw poker card games to provide to the player; and
    (B) display a subsequent draw poker card game, for each subsequently displayed draw poker game repeat (i) to (vii) with a decreased designated period of time for the player to hold zero, one or more cards for the displayed initial player hand for that displayed subsequent draw poker card game.

10. The gaming system of claim 9, wherein the secondary triggering event occurs if the primary game generates at least one predetermined symbol.

11. The gaming system of claim 9, wherein when executed by the at least one processor, the plurality of instructions cause the at least one processor to operate with the at least one display device to display the initial player hand and the final player hand from a shuffled fifty-two card deck of cards.

12. The gaming system of claim 9, wherein when executed by the at least one processor, the plurality of instructions cause the at least one processor to operate with the at least one input device to enable the player to change the amount of time for the player to hold the cards for at least one displayed initial player hand of a draw poker card game.

13. The gaming system of claim 9, wherein when executed by the at least one processor, the plurality of instructions cause the at least one processor to operate with the at least one display device to display the designated period of time.

14. The gaming system of claim 9, wherein when executed by the at least one processor, the plurality of instructions cause the at least one processor to automatically replace all the cards in the displayed initial player hand if the player does not hold any of the displayed cards of the initial player hand within the designated period of time.

15. The gaming system of claim 9, wherein a plurality of the awards based on the predetermined winning combination are each based on a paytable.

16. The gaming system of claim 15, wherein when executed by the at least one processor, the plurality of instructions cause the at least one processor to modify the paytable based on a quantity of draw poker card games played during a designated amount of time.

17. The gaming system of claim 9, wherein when executed by the at least one processor, the plurality of instructions cause the at least one processor to:
  (a) if the displayed final player hand includes a predetermined winning card combination, determine whether the predetermined winning card combination is above a certain level; and
  (b) if the predetermined winning card combination is above a certain level, do not display any subsequent draw poker card games.

18. The gaming system of claim 9, wherein the designated number equals zero.

* * * * *

UNITED STATES PATENT AND TRADEMARK OFFICE
CERTIFICATE OF CORRECTION

PATENT NO. : 8,777,722 B2
APPLICATION NO. : 12/268901
DATED : July 15, 2014
INVENTOR(S) : Scott A. Caputo et al.

It is certified that error appears in the above-identified patent and that said Letters Patent is hereby corrected as shown below:

ON THE TITLE PAGE, item (75) should read:

Inventors: Scott A. Caputo, Santa Clara, CA (US);
Dwayne A. Davis, Reno, NV (US); Scott
T. Hilbert, Sparks, NV (US); Michael
M. Oberberger, Reno, NV (US);
Alexandria E. Sutich, Reno, NV (US)

Signed and Sealed this
Twenty-sixth Day of May, 2015

Michelle K. Lee
*Director of the United States Patent and Trademark Office*